United States Patent
Kwan et al.

(10) Patent No.: US 7,488,380 B2
(45) Date of Patent: Feb. 10, 2009

(54) HIGHLIGHTING MARKING COMPOSITIONS, HIGHLIGHTING KITS, AND HIGHLIGHTED COMPLEXES

(75) Inventors: Wing Sum Vincent Kwan, Chicago, IL (US); Cindy Duong, Chicago, IL (US)

(73) Assignee: Sanford, L.P., Oak Brook, IL (US)

( * ) Notice: Subject to any disclaimer, the term of this patent is extended or adjusted under 35 U.S.C. 154(b) by 248 days.

(21) Appl. No.: 11/432,816

(22) Filed: May 11, 2006

(65) Prior Publication Data

US 2007/0017413 A1 Jan. 25, 2007

Related U.S. Application Data

(63) Continuation-in-part of application No. 11/018,750, filed on Dec. 21, 2004, which is a continuation-in-part of application No. 10/956,584, filed on Oct. 1, 2004, which is a continuation-in-part of application No. 10/680,362, filed on Oct. 7, 2003, now Pat. No. 7,083,665.

(51) Int. Cl.
*C09D 11/00* (2006.01)

(52) U.S. Cl. .................. 106/31.32; 106/31.64
(58) Field of Classification Search .............. 106/31.32, 106/31.64
See application file for complete search history.

(56) References Cited

U.S. PATENT DOCUMENTS

| | | | |
|---|---|---|---|
| 2,029,152 A | 1/1936 | Bonkowski | |
| 3,875,105 A | 4/1975 | Daugherty et al. | |
| 3,886,083 A | 5/1975 | Laxer | |
| 3,941,488 A | 3/1976 | Maxwell | |
| 3,945,837 A | 3/1976 | Miyata et al. | |
| 3,985,455 A | 10/1976 | Wahlberg | |
| 4,029,506 A | 6/1977 | Dessauer | |
| 4,148,591 A | 4/1979 | Tomura | |
| 4,156,657 A | 5/1979 | Lin | |
| 4,213,717 A | 7/1980 | Lin | |
| 4,227,930 A | 10/1980 | Lin | |
| 4,228,028 A | 10/1980 | Lin | |
| 4,252,845 A | 2/1981 | Griffiths et al. | |
| 4,349,639 A | 9/1982 | Muller | |
| 4,413,266 A | 11/1983 | Aviram et al. | |
| 4,509,875 A | 4/1985 | Shintani | |
| 4,557,618 A | 12/1985 | Iwata et al. | |
| 4,580,918 A | 4/1986 | Baker et al. | |
| 4,681,471 A | 7/1987 | Hayduchok et al. | |
| 4,738,725 A | 4/1988 | Daugherty et al. | |
| 4,777,510 A | 10/1988 | Russel | |
| 4,808,227 A | 2/1989 | Yuasa et al. | |
| 4,865,479 A | 9/1989 | Doll | |
| 4,907,903 A * | 3/1990 | Kawashima | 401/151 |
| 4,971,628 A | 11/1990 | Loftin | |
| 5,006,171 A | 4/1991 | Mecke et al. | |
| 5,026,189 A | 6/1991 | Keil | |
| 5,033,895 A | 7/1991 | Aida | |
| 5,048,992 A | 9/1991 | Loftin | |
| 5,053,339 A | 10/1991 | Patel | |
| 5,139,572 A | 8/1992 | Kawashima | |
| 5,215,956 A | 6/1993 | Kawashima | |
| 5,232,494 A | 8/1993 | Miller | |
| 5,256,191 A | 10/1993 | Thompson et al. | |
| 5,326,288 A | 7/1994 | Lu et al. | |
| 5,326,388 A | 7/1994 | Miller et al. | |
| 5,338,123 A | 8/1994 | Obersteller et al. | |
| 5,370,471 A | 12/1994 | Kageyama et al. | |
| 5,378,752 A | 1/1995 | White et al. | |
| 5,417,748 A | 5/1995 | Kawashima | |
| 5,427,278 A | 6/1995 | Gardner | |
| 5,460,647 A | 10/1995 | Snedeker et al. | |
| 5,464,470 A | 11/1995 | Brachman et al. | |
| 5,478,382 A | 12/1995 | Miller et al. | |
| 5,486,228 A | 1/1996 | Miller et al. | |
| 5,489,331 A | 2/1996 | Miller et al. | |
| 5,492,558 A | 2/1996 | Miller et al. | |
| 5,498,282 A | 3/1996 | Miller et al. | |
| 5,498,285 A | 3/1996 | Hooykaas | |
| 5,499,881 A | 3/1996 | Chang | |
| 5,509,742 A | 4/1996 | Balzarini | |

(Continued)

FOREIGN PATENT DOCUMENTS

DE 27 24 820 12/1978

(Continued)

OTHER PUBLICATIONS

Written Opinion for PCT/US2005/040816, dated May 10, 2006.
International Search Report for PCT/US2005/040816, dated May 10, 2006.
International Preliminary Report on Patentability Report for PCT/US2004/033029, dated Apr. 20, 2006.
Written Opinion of International Search Authority for PCT/US04/33029, dated Feb. 9, 2005.
International Search Report for PCT/US04/33029, dated Feb. 9, 2005.
International Search Report for PCT/US2004/020871, dated Oct. 4, 2004.
International Search Report for PCT/US2007/011273, dated Oct. 23, 2007.
Written Opinion of the International Searching Authority for PCT/US2007/011273, dated Oct. 23, 2007.

*Primary Examiner*—J. A. Lorengo
*Assistant Examiner*—Veronica Faison Gee
(74) *Attorney, Agent, or Firm*—Marshall, Gerstein & Borun LLP

(57) ABSTRACT

A highlighting (or marking) composition, such as an ink, including a non-eradicable colorant, an eradicable colorant; a kit including a first marking instrument comprising the highlighting mixture and a second marking instrument comprising an eradicator fluid; a colorant complex including a colorless or substantially colorless eradicable dye, a non-eradicable dye, and an eradicator; and methods of applying an eradicator to at least a portion of a marking made with a highlighting composition, are described herein.

34 Claims, No Drawings

U.S. PATENT DOCUMENTS

| | | | |
|---|---|---|---|
| 5,549,742 A | 8/1996 | Cancellieri |
| 5,593,459 A | 1/1997 | Gamblin |
| 5,649,999 A | 7/1997 | Wang |
| 5,762,077 A | 6/1998 | Griffiths |
| 5,785,746 A | 7/1998 | Kito et al. |
| 5,872,162 A | 2/1999 | McHugh et al. |
| 5,877,234 A | 3/1999 | Xu et al. |
| 5,916,357 A | 6/1999 | Wang et al. |
| 5,964,931 A | 10/1999 | Korper |
| 5,977,211 A | 11/1999 | Koyama |
| 5,988,807 A | 11/1999 | Bernard et al. |
| 5,997,891 A | 12/1999 | Fuerst et al. |
| 6,037,391 A | 3/2000 | Iida |
| 6,048,914 A | 4/2000 | Goto et al. |
| 6,051,629 A | 4/2000 | Ichikawa et al. |
| 6,124,377 A | 9/2000 | Kaiser et al. |
| 6,149,721 A | 11/2000 | Wang et al. |
| 6,179,501 B1 | 1/2001 | Fulop |
| 6,203,603 B1 | 3/2001 | Takayama et al. |
| 6,214,766 B1 | 4/2001 | Kurrle |
| 6,221,432 B1 | 4/2001 | Wang et al. |
| 6,228,804 B1 | 5/2001 | Nakashima |
| 6,261,352 B1 | 7/2001 | Asami |
| 6,276,853 B1 | 8/2001 | Breidenbach et al. |
| 6,306,930 B1 | 10/2001 | Tsujio |
| 6,357,943 B1 | 3/2002 | Kuang |
| 6,406,204 B1 | 6/2002 | Omatsu et al. |
| 6,410,338 B1 | 6/2002 | Lippold et al. |
| 6,412,998 B1 | 7/2002 | Ham |
| 6,489,892 B2 | 12/2002 | Lawandy |
| 6,491,464 B1 | 12/2002 | Young |
| 6,503,317 B1 | 1/2003 | Ortalano et al. |
| 6,518,356 B1 | 2/2003 | Friese et al. |
| 6,554,516 B1 | 4/2003 | Christopher |
| 6,613,135 B1 | 9/2003 | Miyamoto et al. |
| 6,905,539 B2 | 6/2005 | Patel et al. |
| 7,083,665 B1 | 8/2006 | Davies-Smith et al. |
| 7,163,575 B2 | 1/2007 | Kwan et al. |
| 7,229,487 B2 | 6/2007 | Godbout |
| 2001/0006610 A1 | 7/2001 | Miller et al. |
| 2002/0058296 A1 | 5/2002 | Miller et al. |
| 2002/0151084 A1 | 10/2002 | Lippold et al. |
| 2003/0082823 A1 | 5/2003 | Sumitani et al. |
| 2005/0120919 A1 | 6/2005 | Davies-Smith et al. |
| 2005/0158471 A1 | 7/2005 | Davies-Smith et al. |
| 2005/0192379 A1 | 9/2005 | Kwan |
| 2007/0231494 A1 | 10/2007 | Godbout |

FOREIGN PATENT DOCUMENTS

| | | |
|---|---|---|
| DE | 29 27 006 | 4/1979 |
| DE | 199 03 248 | 10/2000 |
| EP | 0 049 777 | 4/1982 |
| EP | 1 085 059 | 3/2001 |
| EP | 1 523 887 A2 | 4/2005 |
| JP | 54-16235 | 6/1979 |
| JP | 60-190479 | 9/1985 |
| JP | 6049397 | 2/1994 |
| JP | 2001-158196 | 6/2001 |
| JP | 2001-247807 | 9/2001 |
| JP | 2003-73602 | 12/2003 |
| WO | WO-2005/035673 A1 | 4/2005 |
| WO | WO-2006/068723 A1 | 6/2006 |

\* cited by examiner

US 7,488,380 B2

HIGHLIGHTING MARKING COMPOSITIONS, HIGHLIGHTING KITS, AND HIGHLIGHTED COMPLEXES

CROSS-REFERENCE TO RELATED APPLICATIONS

This is a continuation-in-part of application Ser. No. 11/018,750 filed on Dec. 21, 2004, which is a continuation-in-part of application Ser. No. 10/956,584 filed on Oct. 1, 2004, the entire disclosures of which are hereby incorporated by reference.

BACKGROUND

1. Technical Field

The disclosure relates generally to color changing compositions, and more particularly to highlighting marking compositions that change from a first color to a second color upon application of an eradicator.

2. Brief Description of Related Technology

Eradicable mixture systems, such as inks, generally include two components. The first component is typically an aqueous mixture that includes a dye that can be rendered substantially colorless when contacted with a substance such as a reducing agent, an oxidizing agent, acidic compounds, or basic compounds (such as hydroxides and amines). The second component is typically an aqueous eradicator fluid which includes one of the aforementioned substances. Thus, a consumer can write with the eradicable mixture and, if correction is necessary, apply an eradicator fluid to the written markings in order to decolorize (or erase) the markings.

Textual information is often highlighted by applying a fluorescent ink there over (e.g., a highlighting ink is applied over a written marking previously made on a substrate such as paper). A typical fluorescent highlighting ink has a translucent quality, which allows a consumer to apply the highlighting ink over the textual information while still being able to read and/or otherwise comprehend the information under the fluorescent ink marking. Although highlighting allows the consumer to selectively emphasize specific information, other areas of the substrate that do not include any information are also highlighted. Such highlighted areas can cause photocopies of the highlighted text to be unreadable.

Multiple colorants are often mixed together to provide the overall color of a particular highlighting composition. Combinations of multiple colorants can cause the highlighting composition to become somewhat dark or muddy in appearance, particularly when a highlighting composition is attempted in a primary color. This darkening of the composition can cause the (attempted) primary color to substantially appear as a secondary color to the human eye. For example, highlighting compositions which are intended to be blue or red can appear grayish or even somewhat black.

SUMMARY

One aspect of the disclosure provides a highlighting composition comprising at least one eradicable colorant, at least one non-eradicable dye, and at least one solvent.

Another aspect of the disclosure provides a method of highlighting comprising making a marking with a highlighting composition comprising at least one eradicable colorant, at least one non-eradicable dye, and at least one solvent, and applying an eradicator to the marking to form a highlighted marking. Both the highlighting composition and the eradicator can be disposed in a writing instrument (e.g., a pen) for ease of use or may be supplied in another applicator form such as a dauber, a bottled free ink solution, a stamp pad, and the like. Preferably, a marking composition described herein is disposed in a writing instrument and the writing instrument is, for example, a ball-point pen, an extruded plastic porous tip pen, or a marker. The ink may alternatively be disposed in an ink-jet cartridge.

A further aspect of the disclosure is a method of reversibly highlighting comprising making a marking with a highlighting composition comprising at least one eradicable colorant, at least one non-eradicable dye, and at least one solvent, applying an eradicator to the marking to form a highlighted marking, and applying an agent capable of substantially converting the highlighted marking back to its original form.

Another aspect of the disclosure is a kit comprising a first marking instrument comprising a highlighting composition comprising at least one eradicable colorant, at least one non-eradicable dye, and at least one solvent, and a second marking instrument comprising an eradicator fluid.

Yet another aspect of the disclosure is a complex comprising a mixture of at least one eradicated colorant, at least one non-eradicable dye, and at least one eradicator compound, wherein, optionally, the complex is free of volatile solvents.

A further aspect of the disclosure provides an ink-jet cartridge containing an ink comprising at least one eradicable colorant, at least one non-eradicable dye, and at least one solvent. The disclosure further provides a method of printing with such inkjet cartridges.

Another aspect of the disclosure provides a method of rotary printing comprising transferring an ink comprising at least one eradicable dye, at least one non-eradicable dye, and at least one solvent from a first cylinder to a substrate carried by a second cylinder.

An additional aspect of the disclosure provides a highlighting composition comprising at least one eradicable colorant, at least one non-eradicable colorant, at least one substantially colorless pH indicator, and at least one solvent.

Another aspect of the disclosure provides a highlighting mixture comprising at least one eradicable colorant, at least one non-eradicable colorant, at least one pH indicator having substantially the same color as the combination of the eradicable colorant(s) and the non-eradicable colorant(s) in the mixture (i.e., substantially the same color as the highlighting mixture), and at least one solvent.

Another aspect of the disclosure provides a method of highlighting comprising making a marking with a highlighting mixture comprising at least one eradicable colorant, at least one non-eradicable colorant, at least one substantially colorless pH indicator and/or at least one pH indicator having substantially the same color as the combination of the eradicable colorant(s) and the non-eradicable colorant(s) in the mixture, and at least one solvent, and applying an eradicator to the marking to form a highlighted marking.

Another aspect of the disclosure is a method of reversibly highlighting comprising making a marking with a highlighting composition comprising at least one eradicable colorant, at least one non-eradicable colorant, at least one substantially colorless pH indicator and/or at least one pH indicator having substantially the same color as the combination of the eradicable colorant(s) and the non-eradicable colorant(s) in the composition, and at least one solvent, applying an eradicator to the marking to form a highlighted marking, and applying an agent capable of substantially converting the highlighted marking back to its original form.

Another aspect of the disclosure is a kit comprising a first marking instrument comprising a highlighting composition comprising at least one eradicable colorant, at least one non-eradicable colorant, at least one substantially colorless pH indicator and/or at least one pH indicator having substantially the same color as the combination of the eradicable colorant (s) and the non-eradicable colorant(s) in the composition, and at least one solvent, and a second marking instrument comprising an eradicator fluid.

Yet another aspect of the disclosure is a complex comprising a mixture of at least one eradicated colorant, at least one non-eradicable colorant, at least one pH indicator having substantially the same color as that of the non-eradicable colorant(s) in the mixture and/or at least one substantially colorless pH indicator, and at least one eradicator compound, wherein, optionally, the complex is free of volatile solvents.

A further aspect of the disclosure provides an ink-jet cartridge containing an ink comprising at least one eradicable colorant, at least one non-eradicable colorant, at least one substantially colorless pH indicator and/or at least one pH indicator having substantially the same color as the combination of the eradicable colorant(s) and the non-eradicable colorant(s) in the ink, and at least one solvent. The disclosure further provides a method of printing with such ink-jet cartridges.

Another aspect of the disclosure provides a method of rotary printing comprising transferring an ink comprising at least one eradicable colorant capable of becoming substantially colorless or of changing color, at least one non-eradicable colorant incapable of becoming substantially colorless or of changing color, at least one substantially colorless pH indicator or at least one pH indicator having substantially the same color as the combination of the eradicable colorant(s) and the non-eradicable colorant(s) in the mixture, and at least one solvent from a first cylinder to a substrate carried by a second cylinder.

A further aspect of the disclosure provides an ink-jet cartridge containing an ink comprising at least one eradicable dye, at least one non-eradicable pigment, and at least one solvent. The disclosure further provides a method of printing with such ink-jet cartridges.

Yet another aspect of the disclosure provides a method of rotary printing comprising transferring an ink comprising at least one eradicable dye, at least one non-eradicable pigment, and at least one solvent from a first cylinder to a substrate carried by a second cylinder.

Further aspects and advantages of the disclosure will be apparent to those skilled in the art from a review of the following detailed description, taken in conjunction with the appended claims. While the highlighting compositions, methods, kits, and complexes are susceptible of embodiments in various forms, the description hereinafter includes specific embodiments with the understanding that the disclosure is illustrative, and is not intended to limit the claims to the specific embodiments described herein.

DETAILED DESCRIPTION

The disclosure provides highlighting compositions which change color from a first color to a second color upon application of an eradicator. Because only the markings (or other graphical information) made with the highlighting compositions change colors, a consumer can selectively highlight (or emphasize) specific textual and/or graphical information on a substrate without highlighting other areas of the substrate (i.e., any areas which do not comprise the selected textual or graphical information).

In various embodiments, the highlighting compositions address problems involving smearing of markings made with the highlighting composition (particularly upon the application of an eradicator fluid) and/or the relative darkness or dirtiness of the (initial or final) color of the markings. The highlighting compositions may be advantageously used to make written markings. Various printing methods including but not limited to rotary printing and desktop printing may also be used to make markings with the highlighting compositions described herein.

One aspect of the disclosure provides a highlighting composition comprising at least one eradicable colorant, at least one non-eradicable dye, and at least one solvent to dissolve and/or disperse the eradicable colorant(s) and the non-eradicable colorant(s) in the composition.

As used herein, the term "eradicable colorant" refers to a colorant that contributes color to a given mixture and is capable of being rendered substantially colorless or of changing colors after coming into contact with an eradicator (e.g., such as when an eradicator fluid is applied to a marking made with a highlighting composition containing the eradicable colorant.) The eradicable colorant may be an eradicable pigment or an eradicable dye, but is typically an eradicable dye.

As used herein, the term "non-eradicable dye" generally refers to a dye that is not rendered substantially colorless and/or does not change colors after coming into contact with an eradicator (e.g., the non-eradicable dye does not change colors when an eradicator fluid is applied to a marking made with a mixture containing a non-eradicable dye.) Non-eradicable dyes are therefore generally chemically stable, e.g., non-eradicable dyes generally do not change colors when contacted with reducing agents, oxidizing agents, acidic compounds, basic compounds, and/or heat, particularly in a time frame desirable for use in the highlighting compositions disclosed herein.

An additional aspect of the disclosure provides a highlighting composition comprising at least one eradicable colorant, at least one non-eradicable colorant, at least one substantially colorless pH indicator, and at least one solvent. According to this aspect, the substantially colorless pH indicator(s) is preferably converted to a colored form upon application of an eradicator to a marking made with the highlighting composition, and the colored form of the pH indicator(s) is preferably substantially the same color as the non-eradicable colorant(s) in the compositions. Thus, the substantially colorless pH indicator(s) does not interfere or otherwise muddy the initial color of the highlighting composition, but does contribute to the ('final') color of highlighted markings after application of an eradicator.

As used herein, the term "non-eradicable colorant" refers to all colorants including but not limited to non-eradicable pigments and non-eradicable dyes that are not rendered substantially colorless or do not change colors after coming into contact with an eradicator (e.g., such as when an eradicator fluid is applied to a marking made with a mixture containing an non-eradicable colorant.) Non-eradicable colorants are therefore generally chemically stable, e.g., non-eradicable colorants do not change colors when contacted with reducing agents, oxidizing agents, acidic compounds, basic compounds, and/or heat.

Another aspect of the disclosure provides a highlighting composition comprising at least one eradicable colorant, at least one non-eradicable colorant, and at least one pH indicator having substantially the same color as the combination of the eradicable colorant(s) and the non-eradicable colorant(s) in the mixture (i.e., substantially the same color as the combination of the eradicable colorant(s) and the non-eradicable colorant(s) in the composition), and at least one solvent. According to this aspect, the pH indicator(s) has substantially the same color as the combination of the eradicable colorant(s) and the non-eradicable colorant(s) in the mixture, and thus does not interfere or otherwise muddy the initial color of the highlighting composition. Further, the pH indicator preferably does not interfere or otherwise muddy the 'final' color of the highlighting composition because it is preferably converted to a substantially colorless form or to a color substantially the same as the non-eradicable colorant(s) in the mixture.

A further aspect of the disclosure is a complex comprising a mixture of at least one eradicated colorant, at least one non-eradicable dye, and at least one eradicator compound, wherein, optionally, the complex is free of volatile solvents.

As used herein, the term "eradicated colorant" refers to an eradicable colorant that has been acted upon by an eradicator and has been rendered substantially colorless or has changed color due to the effect of the eradicator.

Eradicators are generally chemical compounds including but not limited to oxidizing agents, reducing agents, and acid-base reactants, but heat may also be used in some embodiments according to the disclosure.

Yet another aspect of the disclosure is a complex comprising a mixture of at least one eradicated colorant, at least one non-eradicable colorant, at least one substantially colorless pH indicator and/or at least one pH indicator having substantially the same color as that of the non-eradicable colorant(s) in the mixture, and at least one eradicator compound, wherein, optionally, the complex is free of volatile solvents.

In another aspect, the disclosure provides a method of reversibly highlighting, comprising applying a highlighting composition comprising at least one eradicable dye, at least one non-eradicable dye, and at least one solvent to a substrate to make a marking, applying an eradicator to the marking to form a highlighted marking, and applying an agent capable of substantially converting the highlighted marking back to its original form. When, for example, the eradicator is a reducing agent (e.g., an aqueous mixture containing a sulfite compound), an oxidizing agent is typically selected as the agent to substantially reverse the eradication of the eradicable dye(s). Similarly, when the eradicator is an oxidizing agent, a reducing agent is typically selected as the agent to substantially reverse the eradication of the eradicable dye(s). In another example, when an acid is used as the eradicator (e.g., an aqueous mineral acid), a base is typically selected as the agent to substantially reverse the eradication of the eradicable dye(s). Additionally, when a base is used as the eradicator, an acid is often used as the agent selected to substantially reverse the eradication of the eradicable dye(s).

A further aspect of the disclosure is a method of reversibly highlighting comprising making a marking with a highlighting composition comprising at least one eradicable colorant, at least one non-eradicable colorant, at least one substantially colorless pH indicator and/or at least one pH indicator having substantially the same color as the combination of the eradicable colorant(s) and the non-eradicable colorant(s) in the composition, and at least one solvent, applying an eradicator to the marking to form a highlighted marking, and applying an agent capable of substantially converting the highlighted marking back to its original form.

The process of making highlighting markings and highlighting of same involves making a marking (e.g., by writing or printing on a substrate such as paper) with a highlighting mixture as described herein, and applying an eradicator to the marking. Preferably, the volatile solvent(s) present in the highlighting mixture (e.g., water) will at least substantially evaporate before an eradicator fluid is applied thereto so as to form highlighted markings.

The eradicator is usually applied to the marking using a solution or fluid comprising an eradicator compound, but heat may also be used in some embodiments, as previously mentioned. Contact between the eradicable colorant(s) and the eradicator(s) (or application of the eradicator to a highlighting composition comprising an eradicable colorant) converts the eradicable colorant(s) into a substantially colorless compound(s) or another color. The non-eradicable colorant(s) is preferably substantially unaffected by the eradicator and thus continues to contribute to the color of the composition, and thus the color of the highlighted text. Similarly, the color of the non-eradicable colorant contributes to the overall color of the complex created by the mixture of eradicated colorant, non-eradicable colorant, and eradicator that is created when the eradicator (e.g., a solution containing the eradicator) is applied to markings made with the highlighting mixture.

It is believed that for triarylmethane dyes, for example, the active colored dye is able to reflect color in the visible range (between 380 nm to 780 nm) because of the conjugation of the aromatic rings in the molecule; however, once an appropriate eradicator (e.g., an oxidizing agent such as sodium hypochlorite) is applied to the triarylmethane dye, it destroys the conjugation of the dye. Once this change in hybridization takes place, the conjugation between the various rings of the dye molecule is lost and the dye molecule becomes substantially colorless (or changes color). Other eradicators including but not limited to reducing agents (e.g., sodium sulfite), acids, bases, and mixtures thereof may also be applied to eradicable colorants so as to eradicate their colors. The process of highlighting with a highlighting composition as described herein therefore involves the eradication of the eradicable colorant(s) in the mixture.

A highlighting composition described herein can have three different colored states. The first state can be described as the original or non-eradicated state, wherein the composition (or at least a portion of a marking made with the same) has not come in contact with an eradicator. A second state of color can be described as the eradicated or highlighted state, wherein the composition (or at least a portion of a marking made with the composition) has come in contact with the eradicator and the composition has changed color, preferably such that the color change is sufficient to be perceptible to the human eye. A third state of color can be described as the reversed state, wherein the color of the mixture (or mark) includes contributions from the non-eradicable colorant(s) and the eradicable colorant(s) in the composition, as the eradicable colorant(s) has been substantially converted back to its original or non-eradicated color. If complete reversal is possible, the third state of color is the same as or visually indistinguishable from the first state. Once the eradicable colorant (e.g., an eradicable dye) is eradicated (i.e., the composition is in the highlighted state), the color of the composition is primarily determined by the color contributed by the non-eradicable colorant(s) in the composition. It is generally preferred that the color of the non-eradicable colorant(s) be different than the color of the composition in its non-eradicated state so as to achieve highlighting and reversal effects that are at least noticeable to the human eye.

As previously set forth, the term "eradicable colorant" refers to a colorant (i.e., a material that contributes color to a given mixture) that is capable of being rendered substantially colorless or capable of changing colors after coming into contact with an eradicator (e.g., such as when an eradicator fluid is applied to a marking made with a marking composition containing an eradicable colorant). Eradicable colorants typically change color or become substantially colorless within about 60 minutes, more preferably within about 5 minutes, even more preferably within about 60 seconds, and/or most preferably within about 30 seconds after coming into contact with an eradicator. Eradicable colorants having slower responses should generally be avoided because speedier responses are typically desired so as to provide the consumer with nearly immediate visual feedback concerning the highlighted effect, as described herein. A fluid containing between about 1 wt. % to about 10 wt. % of an eradicator can be used to determine whether a specific dye changes colors within a certain time frame.

As described in greater detail below, nonlimiting examples of eradicable colorants include eradicable dyes such as triarylmethane dyes, diarylmethane dyes, methine dyes, eradicable pigments, and (colored) pH indicators. Each of the foregoing contributes color to a given mixture (e.g., before application of an eradicator fluid) and is capable of becoming substantially colorless or of changing colors after coming into contact with an eradicator. Thus, eradicable colorants include pH indicators that are colored before the application of an eradicator fluid, and change color or become substantially colorless after coming into contact with an eradicator. Conversely, when a pH indicator is substantially colorless before coming into contact with an eradicator (i.e., the pH indicator does not contribute to the initial color of the composition) and optionally becomes colored after coming into contact with an eradicator, that pH indicator is not considered an "eradicable colorant." When formulating a highlighting ink of a particular color, the rate of eradication of an eradicable colorant is a consideration when selecting an eradicable colorant. It is believed that the rate of eradication of eradicable colorants such as pH indicators, diarylmethane, triarylmethane, and methine dyes is proportional to the concentration of the eradicable dye(s) in the mixture (e.g., ink or marking made with a mixture). The total amount of colorants (including both eradicable and non-eradicable) is present in an amount at least about 0.01% and up to about 50% by weight of the total weight of the mixture, at least about 0.1% and up to about 20% by weight, for example up to about 3.5%, up to about 7%, or up to about 10% by weight.

Typically, the eradicable colorant(s) is present in the highlighting composition in an amount of about 0.01 to about 30 wt. %, about 0.50 to about 25 wt. %, about 1 to about 20 wt. %, and/or about 2.5 to about 20 wt. %. The wt. % values provided herein for eradicable colorants are based on the amount of solids in the highlighting compositions when an eradicable dye is used and the amount of a pigment dispersion when an eradicable pigment is used. Typically, the pigment solids content of a pigment dispersion used in a highlighting composition is equal to about 40 to about 60 wt. % of the pigment dispersion.

The non-eradicable colorant(s) is present in the highlighting composition in an amount of about 0.01 to about 30 wt. %, about 0.50 to about 25 wt. %, about 1 to about 20 wt. %, and/or about 2.5 to about 20. The wt. % values provided herein for non-eradicable colorants are based on the amount of solids in the highlighting compositions when a non-eradicable dye is used and the amount of a pigment dispersion when a non-eradicable pigment is used. Typically, the pigment solids content of a pigment dispersion used in a highlighting composition is equal to about 40 to about 60 wt. % of the pigment dispersion.

When a pH indicator having substantially the same color as that of the non-eradicable colorant(s) in the mixture and/or a (initially) substantially colorless pH indicator is used in a highlighting composition, the pH indicator(s) is present in an amount of about 0.5 to about 20 wt. %, about 1 to about 15 wt. %, about 2 to about 10 wt. %, and/or about 2.5 to about 7.5 wt. %. The wt. % values provided for pH indicators are based on the amount of pH indicator solids in the highlighting compositions.

The initial color of the highlighting composition (e.g., ink) will primarily be determined by the combination of colorants (both eradicable and non-eradicable) which causes the composition to reflect a particular wavelength of visible light. Colorants of different colors can be mixed to form a highlighting mixture in a wide variety of colors. The color selection can be done with varying amounts of two or more complementary colors, or combinations that contain one or more primary colors (red, yellow, and blue). When two complementary colors are mixed, the resultant mixture is gray, with black being the completely saturated form of gray.

In one embodiment, the color of the composition in its non-eradicated state is black, and the color of the composition in the eradicated state is either red, green, or blue. In another embodiment, the color of the composition in the non-eradicated state is a primary color (blue, green, or yellow), and the color of the composition in the eradicated state is a different color. In one aspect of this embodiment, the color of the composition in the non-eradicated state is blue, and the color of the composition in the eradicated state is red. When combining two or more colors to form an ink of a desired color, the desired color (e.g., black) may be considered to be reached even though an undertone of another color (e.g., a reddish color) might be perceptible. For example, an ink that is colored black can have a red or a green undertone, and yet still be considered a black ink.

In the colored state, the di- and triarylmethane, pH indicators, and methine dyes often contain one or more cationic imine groups. The generic structure of a representative triarylmethane eradicable dye is shown below in formula (II):

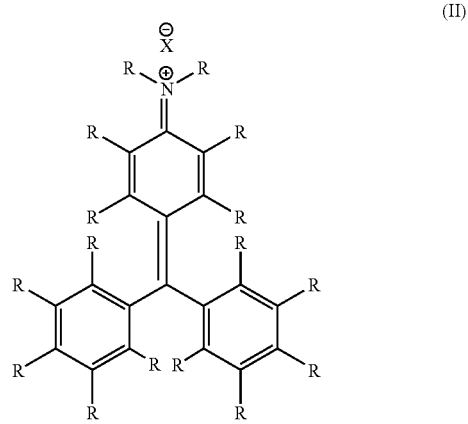

(II)

wherein each R group is the same or different and preferably is selected from $C_1$ to $C_{10}$ alkyl groups. A non-exhaustive list of eradicable triarylmethane dyes for use in highlighting compositions described herein are listed below in Table I.

TABLE I[1]

| Color Index Name | Color Index No. | Common/Commercial Name |
|---|---|---|
| Acid Blue 22 | 42755 | Water Blue I |
| Acid Blue 93 | 42780 | Methyl Blue |
| Acid Fuchsin | 42685 | Acid Fuchsin |
| Acid Green | 42095 | Light Green Sf Yellowish |
| Acid Green 5 | 42095 | Light Green Sf Yellowish |

TABLE I[1]-continued

| Color Index Name | Color Index No. | Common/Commercial Name |
| --- | --- | --- |
| Acid Magenta | 42685 | Acid Fuchsin |
| Acid Roseine | 42685 | Acid Fuchsin |
| Acid Rubin | 42685 | Acid Fuchsin |
| Acid Violet 17 | 42650 | Acid Violet 4BN |
| Acid Violet 19 | 42685 | Acid Fuchsin |
| Alizarol Cyanin R | 43820 | Eriochrome Cyanin R |
| Aluminon | 43810 | Triphenylmethane Chrome Violet Cg |
| Aniline Blue Ws | | Aniline Blue Ws |
| Basic Blue 8 | 42563 | Victoria Blue 4r |
| Basic Blue 15 | 44085 | Night Blue |
| Basic Blue 20 | 42585 | Methyl Green |
| Basic Blue 26 | 44045 | Victoria Blue B |
| Basic Fuchsin | | Basic Fuchsin |
| Basic Green 4 | 42000 | Malachite Green |
| Basic Red 9 | 42500 | Pararosanilin |
| Basic Red 14 | 48016 | Cationic Brilliant Red 5GN |
| Basic Red 29 | 11460 | — |
| Basic Violet 2 | 42520 | New Fuchsin |
| Basic Violet 3 | 42555 | Crystal Violet |
| Basic Violet 4 | 42600 | Ethyl Violet |
| Basic Violet 14 | 42510 | Rosanilin |
| Chrome Violet Cg | 43810 | Triphenylmethane Chrome Violet Cg |
| Chromoxane Cyanin R | 4382 | Eriochrome Cyanin R |
| Cotton Blue | 42780 | Methyl Blue |
| Crystal Violet | 42555 | Crystal Violet |
| Dahlia | 42530 | Hoffman's Violet |
| Diamond Green B | 42000 | Malachite Green |
| Eriochrome Cyanin R | 43820 | Eriochrome Cyanin R |
| Ethyl Green | 42590 | Ethyl Green |
| Ethyl Violet | 42600 | Ethyl Violet |
| Gentian Violet | | Methyl Violet 2b |
| Helvetia Blue | 42780 | Methyl Blue |
| Hoffman's Violet | 42530 | Hoffman's Violet |
| Light Green | 42095 | Light Green Sf Yellowish |
| Lissamine Green Sf | 42095 | Light Green Sf Yellowish |
| Magenta 0 | 42500 | Pararosanilin |
| Magenta I | 42510 | Rosanilin |
| Magenta II | | Magenta II |
| Magenta III | 42520 | New Fuchsin |
| Malachite Green | 42000 | Malachite Green |
| Methyl Blue | 42780 | Methyl Blue |
| Methyl Green | 42585 | Methyl Green |
| Methyl Violet | 42535 | Methyl Violet 2b |
| Methyl Violet 2b | 42535 | Methyl Violet 2b |
| Methyl Violet 10b | 42555 | Crystal Violet |
| Mordant Violet 39 | 43810 | Triphenylmethane Chrome Violet Cg |
| New Fuchsin | 4252 | New Fuchsin |
| Night Blue | 44085 | Night Blue |
| Pararosanilin | 42500 | Pararosanilin |
| Primula | 42530 | Hoffman's Violet |
| Rosanilin | 42510 | Rosanilin |
| Solochrome Cyanin R | 43820 | Eriochrome Cyanin R |
| Victoria Blue 4r | 42563 | Victoria Blue 4r |
| Victoria Blue B | 44045 | Victoria Blue B |
| Victoria Green B | 42000 | Malachite Green |
| Water Blue I | 42755 | Water Blue I |

[1]See, R. D. Lillie, Conn's Biological Stains (8th ed., 1969), Williams and Wilkins Company, Baltimore, Maryland; Susan Budavari (Ed.), The Merck Index, (12th ed., 1996), Merck & Co., Whitehouse Station, N.J; see also, P. A. Lewis (Ed.), Pigment Handbook Vol. I, Properties and Economics, sections I(D)f(1) and I(D)g, John Wiley & Sons, (2$^{nd}$ ed., 1988); H. Zollinger, Color Chemistry: Syntheses, Properties, and Applications of Organic Dyes And Pigments, Chapter 4, VCH Publishers (1987); D. R. Waring and G. Hallas (Eds.), The Chemistry and Application of Dyes, Chapter 2, Section IX, Plenum Press (1990); and M. Okawara, T. Kitao, T. Hirashima, and M. Matsuoka, Organic Colorants: A Handbook of Data of Selected Dyes for Electro-Optical Applications, Section VI, Elsevier (1988), the disclosures of which are hereby incorporated by reference.

Diaryl methane eradicable dyes include but are not limited to Auramine 0 (Chemical Index No. 41000) and Basic Yellow 2 (Chemical Index No. 41000).

Other eradicable colorants that can be used in a highlighting composition described herein are methine (or polymethine) dyes. Methine dyes generally contain one or more methine group chromophores (—CH=), also called methylidyne or methine groups. When a methine dye only contains one methine group, the dye is sometimes referred to as a cyanine dye, with three methine groups the dye is sometime referred to as a carbocyanine dye, and with more than three methine groups the dye is often referred to as a polymethine dye. An example of a methine dye is Thiazole Orange (shown below):

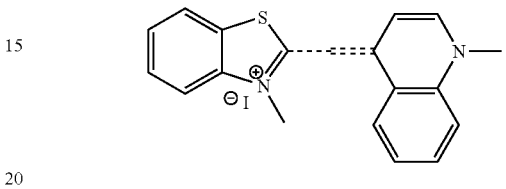

wherein the bonds that make up the methine group are shown above as broken lines. Other examples of methine dyes include Basic Red 15, Basic Yellow 11, Basic Yellow 13, Basic Yellow 21, Basic Yellow 28, Basic Yellow 29, Basic Yellow 49, and Methyl Blue. For a comprehensive listing of methine dyes, see F. M. Hamer, The Chemistry of Heterocyclic Compounds, and A. Weissberger (Ed.), The Cyanine Dyes and Related Compounds, Wiley Interscience, New York (1964), the disclosures of which are hereby incorporated herein by reference.

Yet another type of eradicable colorant that can be used in a highlighting composition described herein are pH indicators. Eradicable pH indicators are pH sensitive colorants that are colored prior to coming into contact with an eradicator. Indicators are designed to change color upon a change in pH, usually via an acid-base reaction which alters the chromophore of the indicator. See, Bishop, E., Indicators, Pergamon, Oxford, 1972, the disclosure of which is hereby incorporated herein by reference. Indicators for use with a highlighting composition described herein include the following dyes (the approximate operable pH range(s) at which the indicator changes from substantially colorless to colored or from a first color to a second color are given in parentheses; some dyes have two different color transitions): Alizarin (5.6-7.2; 11.0-12.4); Alizarin Red S (4.3-6.3); Alizarin Yellow R (10.1 - 12.0); Benzopurpurine 4B (2.2-4.2); 4,4'-Bis(2-amino-1-naphthylazo)-2,2'-stilbenedisulfonic acid (3.0-4.0); 4,4'-Bis(4-amino-l-naphthylazo)-2,2'-stilbenedisulfonic acid (8.0-9.0); Brilliant Yellow (6.6-8.0); Bromocresol Green (3.8-5.4); Bromocresol Purple (5.2-6.8); Bromophenol Blue (3.0-4.6); Bromothymol Blue (6.0-7.0); Chlorophenol Red (5.2-8.8); Clayton Yellow (12.2-13.2); Congo Red (3.0-5.2); o-Cresolphthalein (7.8-9.8); Eosin B (1.4-2.4); Eosin Y (0.0-3); Quinaldine Red (1.0-3.2); Cresol Red (0.0-1.0; 7.0-8.8); Crystal Violet (0.0-1.8); Curcumin (Turmeric) (10.2-11.8); p-(2,4-Dihydroxyphenylazo) benzenesulfonic acid, sodium salt (11.4-12.6); p-Dimethylaminoazobenzene (2.8-4.4); 4-(4-Dimethylamino-1-naphylazo)-3-methoxybenzene-sulfonic acid (3.5-4.8); 2-(p-Dimethylaminophenylazo)pyridine (0.2-1.8; 4.4-5.6); N,N-Dimethyl-p-(m-tolylazo)aniline (2.6-4.8); 2,4-Dinitrophenol (2.0-4.7); 2-(2,4 Dinitrophenylazo)-1-naphthol-3,6-disulfonic acid, disodium salt (6.0-7.0); 6,8-Dinitro-2,4-(1H)quinazolinedione (6.4-8.0); Erythrosin, disodium salt (2.2-3.6); 4-(p-Exthoxyphenylazo)-m-phenylene-diamine monohydrochloride (4.4-5.8); Ethyl bis(2,4-dimethylphenyl) ethanoate (8.4-9.6); Ethyl Orange (3.2-4.8);

Ethyl Red (4.0-5.8); Ethyl Violet (0.0-2.4); 5,5'-Indigodisulfonic acid, disodium salt (11.4-13.0); Malachite Green (0.2-1.8); Metacresol Purple (1.2-2.8; 7.4-9.0); Metanil Yellow (1.2-2.4); Methyl Green (0.2-1.8); Methyl Orange (3.2-4.4); Methyl Red (4.8-6.0); Methyl Violet (0.0-1.6); p-Naphtholbenzein (8.2-10.0); Neutral Red (6.8-8.0); p-Nitrophenol (5.4-6.6); m-Nitrophenol (6.8-8.6); Orange IV (1.4-2.8); Paramethyl Red (1.0-3.0); Phenolphthalein (8.2-9.8); Phenol Red (6.6-8.0); 4-Phenylazodiphenylamine (1.2-2.6); 4-Phenylazo-1-naphthylamine (4.0-5.6); Propyl Red (4.8-6.6); Quinaldine Red (1.4-3.2); Resazurin (3.8-6.4); Resorcin Blue (4.4-6.2); Tetrabromophenolphthalein ethyl ester, potassium salt (3.0-4.2); Thymol Blue (1.2-2.8; 8.0-9.6); Thymolphthalein (9.4-10.6); 4-o-Tolylazo-o-toluidine (1.4-2.8); 1,3,5-Trinitrobenzene (12.0-14.0); and, 2,4,6-Trinitrotoluene (11.5-13.0). Preferably, the pH indicators are selected from the group consisting of 6,8-dinitro-2,4-(1H)quinazolinedione (6.4-8.0); p-nitrophenol (5.4-6.6); o-cresolphthalein (8.2-9.8); phenolphthalein (8.2-10.0); Ethyl bis(2,4-dimethylphenyl) ethanoate (8.4-9.6); thymolphthalein (9.4-10.6); 1,3,5-Trinitrobenzene (12.0-14.0); Cresol Red (0.0-1.0; 7.0-8.8); Congo Red (3.0-5.2); Thymol Blue (1.2-2.8; 8.0-9.6); Phenol Red (6.4-8.2); Bromocresol Green (3.8-5.4); Bromothymol Blue (6.0-7.6); Methyl Orange (3.2-4.4); and 2,4,6-trinitrotoluene (11.5-13.0).

When at least one of the eradicable colorants used in a highlighting composition is a (colored) pH indicator, the pH of the mixture is preferably controlled by the addition of a pH adjuster to fall within the pH range that a particular pH indicator exhibits its characteristic color. Adjustment of pH of the composition provides a wider variety of functional pH indicators that are colored prior to coming into contact with an eradicator and that can become substantially colorless or change to a different color upon coming into contact with an eradicator. The pH of a mixture can also be adjusted such that the pH indicator is substantially colorless in the initial composition, as described in more detail below. A pH adjuster may be either a volatile (e.g., a volatile amine) or non-volatile (e.g., sodium hydroxide). A pH adjuster may be basic or acidic, and may increase or decrease the pH of a highlighting mixture. Basic compounds that can serve as pH adjusters include but are not limited to compounds such as sodium hydroxide, 2-amino-2-methyl-1-propanol, ammonia, and the like. Acidic compounds that can serve as pH adjusters include but are not limited to phosphoric acid, hydrochloric acid, citric acid, and the like. A pH adjuster optionally may be present in a highlighting composition in an amount of about 0.01% to about 20% by weight, based on the total weight of the composition.

The disclosure generally includes highlighting ink compositions comprising non-eradicable colorants including but not limited to non-eradicable pigments, as described above. If a colorant does not change color or become substantially colorless within about 60 minutes, more preferably within about 5 minutes, even more preferably within about 60 seconds, and/or most preferably within about 30 seconds after coming into contact with an eradicator, it is generally considered to be non-eradicable. Colorants having slower responses should generally be avoided because speedier responses are typically desired so as to provide the consumer with nearly immediate visual feedback concerning the highlighted effect described herein. A fluid containing between about 1 wt. % to about 10 wt. % of an eradicator can be used to determine whether a specific dye changes colors within a certain time frame.

Non-eradicable pigments for use in a highlighting composition described herein cover a wide variety of colors and types, including organic, inorganic, natural, and synthetic pigments. Preferred non-eradicable pigments are substantially insoluble in an aqueous medium and are particulate material that is dispersed in the ink solution. Typically, non-eradicable pigments are chemically inert, non-toxic, and stable to heat and light. A non-exhaustive list of non-eradicable pigments for use in the highlighting compositions described herein are listed below in Table II.

TABLE II

| Pigment Common/<br>Commercial Name | Manufacturer | Color<br>Index Hue |
|---|---|---|
| Permanent Yellow DHG | Hoechst<br>(Frankfurt, Germany) | Yellow 12 |
| Permanent Yellow GR | Hoechst<br>(Frankfurt, Germany) | Yellow 13 |
| Permanent Yellow G | Hoechst<br>(Frankfurt, Germany) | Yellow 14 |
| Permanent Yellow NCG-71 | Hoechst<br>(Frankfurt, Germany) | Yellow 16 |
| Permanent Yellow GG | Hoechst<br>(Frankfurt, Germany) | Yellow 17 |
| Hansa Yellow RA | Hoechst<br>(Frankfurt, Germany) | Yellow 73 |
| Hansa Brilliant Yellow 5GX-02 | Hoechst<br>(Frankfurt, Germany) | Yellow 74 |
| DALAMAR ™ Yellow YT-858-D | Heubach<br>(Langelsheim, Germany) | Yellow 74 |
| Hansa Yellow X | Hoechst<br>(Frankfurt, Germany) | Yellow 75 |
| NOVOPERM ™ Yellow HR | Hoechst<br>(Frankfurt, Germany) | Yellow 83 |
| CHROMOPHTAL ™ Yellow 3G | Ciba-Geigy<br>(Basle, Switzerland) | Yellow 93 |
| CHROMOPHTAL ™ Yellow GR | Ciba-Geigy<br>(Basle, Switzerland) | Yellow 95 |
| NOVOPERM ™ Yellow FGL | Hoechst<br>(Frankfurt, Germany) | Yellow 97 |
| Hansa Brilliant Yellow 10GX | Hoechst<br>(Frankfurt, Germany) | Yellow 98 |
| Permanent Yellow G3R-01 | Hoechst<br>(Frankfurt, Germany) | Yellow 114 |
| CHROMOPHTAL ™ Yellow 8G | Ciba-Geigy<br>(Basle, Switzerland) | Yellow 128 |
| IRGAZIN ™ Yellow 5GT | Ciba-Geigy<br>(Basle, Switzerland) | Yellow 129 |
| HOSTAPERM ™ Yellow H4G | Hoechst<br>(Frankfurt, Germany) | Yellow 151 |
| HOSTAPERM ™ Yellow H3G | Hoechst<br>(Frankfurt, Germany) | Yellow 154 |
| L74-1357 Yellow | Sun Chemical<br>(Cincinnati, Ohio) | |
| L75-1331 Yellow | Sun Chemical<br>(Cincinnati, Ohio) | |
| L75-2377 Yellow | Sun Chemical<br>(Cincinnati, Ohio) | |
| HOSTAPERM ™ Orange GR | Hoechst<br>(Frankfurt, Germany) | Orange 43 |
| PALIOGEN ™ Orange | BASF<br>(Mount Olive, New Jersey) | Orange 51 |
| IRGALITE ™ Rubine 4BL | Ciba-Geigy<br>(Basle, Switzerland) | Red 57:1 |
| QUINDO ™ Magenta | Mobay Chemical<br>(Haledon, New Jersey) | Red 122 |
| INDOFAST ™ Brilliant Scarlet | Mobay Chemical<br>(Haledon, New Jersey) | Red 123 |
| HOSTAPERM ™ Scarlet GO | Hoechst<br>(Frankfurt, Germany) | Red 168 |
| Permanent Rubine F6B | Hoechst<br>(Frankfurt, Germany) | Red 184 |
| MONASTRAL ™ Magenta | Ciba-Geigy<br>(Basle, Switzerland) | Red 202 |
| MONASTRAL ™ Scarlet | Ciba-Geigy<br>(Basle, Switzerland) | Red 207 |
| HELIOGEN ™ Blue L 6901F | BASF<br>(Mount Olive, New Jersey) | Blue 15:2 |
| HELIOGEN ™ Blue NBD 7010 | BASF<br>(Mount Olive, New Jersey) | |
| HELIOGEN ™ Blue K 7090 | BASF<br>(Mount Olive, New Jersey) | Blue 15:3 |
| HELIOGEN ™ Blue L 7101F | BASF<br>(Mount Olive, New Jersey) | Blue 15:4 |

TABLE II-continued

| Pigment Common/Commercial Name | Manufacturer | Color Index Hue |
|---|---|---|
| PALIOGEN ™ Blue L 6470 | BASF (Mount Olive, New Jersey) | Blue 60 |
| HEUCOPHTHAL ™ Blue G, XBT-583D | Heubach (Langelsheim, Germany) | Blue 15:3 |
| HELIOGEN ™ Green K 8683 | BASF (Mount Olive, New Jersey) | Green 7 |
| HELIOGEN ™ Green L 9140 | BASF (Mount Olive, New Jersey) | Green 36 |
| MONASTRAL ™ Violet R | Ciba-Geigy (Basle, Switzerland) | Violet 19 |
| MONASTRAL ™ Red B | Ciba-Geigy (Basle, Switzerland) | Violet 19 |
| HOSTAPERM ™ Orange GR | Hoechst (Frankfurt, Germany) | Orange 43 |
| QUINDO ™ Red R6700 | Mobay Chemical (Haledon, New Jersey) | |
| QUINDO ™ Red R6713 | Mobay Chemical (Haledon, New Jersey) | |
| INDOFAST ™ Violet | Mobay Chemical (Haledon, New Jersey) | Violet 23 |
| MONASTRAL ™ Violet Maroon B | Ciba-Geigy (Basle, Switzerland) | Violet 42 |
| RAVEN ™ 1170 | Columbian Chemicals (Marietta, Georgia) | Black 7 |
| Special Black 4A | Degussa (Parsippany, New Jersey) | Black 7 |
| STERLING ™ NS Black | Eastech Chemical, Inc. (Philadelphia, Pennsylvania) | Black 7 |
| STERLING ™ NSX 76 | Eastech Chemical, Inc. (Philadelphia, Pennsylvania) | Black 7 |
| TIPURE ™ R-101 | Du Pont, (Wilmington, Delaware) | |
| Mogul L | Eastech Chemical, Inc. (Philadelphia, Pennsylvania) | Black 7 |

Suitable non-eradicable dyes include but are not limited to blue non-eradicable dyes, red non-eradicable dyes, violet non-eradicable dyes, yellow non-eradicable dyes, orange non-eradicable dyes, and combinations of the foregoing.

Suitable water soluble blue non-eradicable dyes include but are not limited to Acid Blue 1, Acid Blue 104, Acid Blue 182, Acid Blue 204, Acid Blue 74, Acid Blue 9, Acid Blue 90, Basic Blue 1, Basic Blue 7, Basic Blue 9, Basic Blue 33, Disperse Blue 73, and combinations thereof. Suitable water soluble red non-eradicable dyes include but are not limited to Acid Red 18, Acid Red 249, Acid Red 52, Acid Red 87, Acid Red 92, Basic Red 22, Basic Red 28, Basic Red 46, and combinations thereof. Suitable water soluble violet non-eradicable dyes include but are not limited to Acid Violet 12, Acid Violet 126, Basic Violet 10, and combinations thereof. Suitable water soluble yellow non-eradicable dyes include but are not limited to Acid Yellow 17, Acid Yellow 118, Acid Yellow 23, Acid Yellow 3, Acid Yellow 32, Acid Yellow 36, Basic Yellow 37, Basic Yellow 40, and combinations thereof. Suitable water soluble orange non-eradicable dyes include but are not limited to Acid Orange 10, and combinations thereof.

Suitable non-eradicable solvent dyes include but are not limited to azo dyes, Solvent Yellow 14, Solvent Yellow 16, Solvent Yellow 28, Solvent Yellow 43, Solvent Yellow 56, Solvent Yellow 145, Solvent Yellow 93, Solvent Yellow 163; Solvent Orange 7, Solvent Orange 60, Solvent Orange 86, Solvent Orange 114; Solvent Red 1, Solvent Red 19, Solvent Red 24, Solvent Red 49, Solvent Red 52, Solvent Red 122, Solvent Red 135, Solvent Red 160; Solvent Violet 13, Solvent Green 7, Solvent Blue 4, Solvent Blue 35, Solvent Blue 36, Solvent Blue 67, Solvent Blue 79; Solvent Black 5, Solvent Black 7. Representative commercially available non-eradicable solvent dyes include but are not limited to UNIFLOW® Yellow 1110 (United Color Manufacturing, Inc, PA), SUDAN® Blue 670 (BASF Chemical Company, NJ); SUDAN® Yellow 146 (BASF Chemical Company, NJ), nigrosine (Aldrich Chemical Co., WI), SUDAN® S Orange 261 (BASF Chemical Company, NJ), Solvent Yellow 14 (Pylam Products, Inc., AZ), Solvent Yellow 28 (Pylam Products, Inc., AZ), Solvent Yellow 56 (Pylam Products, Inc., AZ); NEOZAPON® Red 335 (BASF Chemical Company, NJ); NEOZAPON® Red 365 (BASF Chemical Company, NJ); SUDAN® M Red 380 (BASF Chemical Company, NJ); NEOZAPON® Blue 807 (BASF Chemical Company, NJ), ORACET® Yellow 3GN (Ciba Specialty Chemicals, NJ), ), ORACET® Red GN (Ciba Specialty Chemicals, NJ); SUDAN® Yellow 150 (BASF Chemical Company, NJ), NEOZAPON® Blue 807 (BASF Chemical Company, NJ); and the like.

It is often desirable for the highlighting markings to exhibit an initial color that represents one of the primary colors: red, yellow, or blue. The combination of non-eradicable colorants and eradicable colorants provide the initial color of the highlighting marking compositions, as previously described. Unfortunately, the combination of colorants can cause the highlighting composition to appear too dark or muddy (at least relative to a "true" primary color) in the uneradicated state. In practice, a primary color marking composition is often too dark or muddy because it includes colorants that are (at least somewhat) complementary, and thus the color does not accurately resemble the intended primary color to the human eye. For example, a dark or muddy yellow color can appear orange to the human eye, and a dark or muddy red or blue color can appear black to the human eye. The use of a pH indicator that is initially substantially colorless (before coming into contact with an eradicator) and becomes colored (shortly after coming into contact with the eradicator) facilitates a highlighting composition which uses less colorants to provide the initial color of the highlighting composition (because, for example, the pH indicator can become colored upon contact with an eradicator and provide color to the highlighted text) and therefore does not interfere or otherwise muddy the initial color of the highlighting composition. The substantially colorless pH indicator can also be included to improve the contrast between the initial and highlighted text. Thus, in one embodiment, the disclosure provides a highlighting composition (i.e., a highlighting composition initially having a primary color) comprising at least one substantially colorless pH indicator, at least one eradicable colorant, at least one non-eradicable colorant, and at least one solvent. The highlighting composition can initially be of a primary color.

Alternatively, a pH indicator that is substantially the same color as the combination of the eradicable dye(s) and the non-eradicable colorant(s) in the highlighting composition (before an eradicator is applied to markings made with the combination of colorants) and changes to a second color (shortly after coming into contact with the eradicator) also does not interfere or otherwise muddy the initial color of the highlighting composition. Further, a pH indicator that is substantially the same color as the combination of the eradicable dye(s) and the non-eradicable colorant(s) in the highlighting composition can be included to improve the contrast between the initial and highlighted text. Accordingly, another embodiment of the disclosure is a highlighting composition including at least one pH indicator having substantially the same color as the combination of the eradicable dye(s) and the non-eradicable colorant(s) in the composition, at least one eradicable colorant, at least one non-eradicable colorant, and at least one solvent.

Suitable pH indicators for use with the foregoing embodiments including pH indicators include but are not limited to the previously mentioned pH indicators. Particularly useful pH indicators include Congo Red (changes from blue at pH values below about 3.0 to red at a pH values above about 5.2), o-Cresolphthalein (changes from substantially colorless to red over a pH range of about 7.8 to about 9.8), Eosin B (changes from substantially colorless to pink over a pH range of about 1.4 to about 2.4), Phenolphthalein (changes from substantially colorless to red/violet over a pH range of about 8.2 to about 9.8), Ethyl Red (changes from substantially colorless to red over a pH range of about 4.0 to about 5.8), Quinaldine Red (changes from substantially colorless to pink over a pH range of about 1.4 to about 3.2), and combinations of the foregoing. In various embodiments including pH indicators, the color of the composition in the non-eradicated state is a primary color (blue, green, or yellow), and the color of the composition in the eradicated state is a different color. To prepare a highlighting composition having a particular primary color, the amount and color of colored pigment(s) (whether eradicable or non-eradicable) and the amount and color of dye(s) (whether eradicable or non-eradicable) in the highlighting composition are selected to produce the desired color of the highlighting composition in its non-eradicated state. In one aspect of this embodiment, the color of the composition in the non-eradicated state is blue, and the color of the composition in the eradicated state is red.

One problem associated with highlighting compositions or mixtures that use pigment dispersions as (at least one of) the non-eradicable colorant(s) involves the decreased stability of the highlighting mixture (e.g., an ink). It is believed that the pigment dispersions tend to agglomerate and form larger clusters (of particles). Particle agglomeration is of particular concern when the highlighting compositions are used in a marking instrument such as a writing instrument having a fine writing point or an ink-jet printer because the pigment particles can create a blockage (e.g., at the writing point or ink-jet nozzle head). Further, in a typical writing instrument, there is some degree of drying of the ink on the writing point, and this drying can result in deposit formation on and about the writing tip. When an insoluble pigment dispersion is used, the dried pigments deposited on the writing point can not be readily re-dispersed in the ink solvent system (and thus can not be readily removed from the writing point). Furthermore, when a marking is made on a substrate that is not sufficiently porous, the pigment particles may not fully settle into the pores of the substrate (if present), and consequently, the pigment can be smeared. Similarly, smearing issue is of particular concern when the highlighting compositions are used to make markings on non-porous substrates or on substrates that have relatively small pores (e.g., substrates having pores sized less than about 1 micron and/or less than about 0.50 microns). Highlighting compositions in accordance with the disclosure which comprise which are substantially free of pigments (as defined herein) provide different advantages than highlighting or marking compositions comprising pigments. For example, such highlighting compositions do not appreciably smear when contacted with an eradicator fluid, even when the highlighted markings are applied to non-porous substrates. In the context of this disclosure, "substantially free of pigments" means that the highlighting compositions contain less than about 5 weight percent, less than about 2.5 weight percent, and/or less than about 1 weight percent of pigments. Accordingly, one embodiment of the highlighting compositions and methods described herein is a highlighting composition including at least one eradicable dye, at least one non-eradicable dye, and at least one solvent, wherein the composition is substantially free of pigments.

Another problem in the selection of colorants for use in a highlighting marking composition involves the solubility of the dried marking made with the highlighting composition in the eradicator fluid applied thereto (at least in the embodiments where an eradicator fluid is used to effect color change). In particular, when a marking is made with a highlighting composition containing a non-eradicable dye(s), the non-eradicable dye(s) may be susceptible to smearing upon eradication (e.g., due to the shear force of the eradication and/or the solubility of the non-eradicable dye in the eradicator fluid applied thereto). Smearing is substantially minimized during the eradication of a marking when the highlighting composition includes a non-eradicable dye that is substantially insoluble in the eradicator fluid medium (e.g., water). Non-eradicable colorants which are substantially insoluble in the eradicator fluid medium applied thereto are able to remain as effective colorants on a given substrate (e.g., paper) after eradication.

Thus, when the eradicator fluid comprises an aqueous fluid, the use of non-eradicable dyes that are substantially insoluble in water as the non-eradicable colorants significantly reduces smearing relative to highlighting compositions including non-eradicable pigments and/or highlighting compositions including non-eradicable dyes that are soluble in water. Suitable non-eradicable dyes that are substantially insoluble in water include but are not limited to solvent dyes. Similarly, when the eradicator fluid comprises a non-aqueous fluid, a non-eradicable dye that is substantially insoluble in the non-aqueous fluid significantly reduces smearing relative to highlighting compositions including non-eradicable pigments and/or highlighting compositions including non-eradicable dyes that are soluble in non-aqueous fluids. Suitable non-eradicable dyes that are substantially insoluble in non-aqueous fluids include but are not limited to water-soluble dyes.

Additionally, highlighting compositions including water soluble dyes that react and/or interact with a given substrate so as to cause the water soluble dyes to adhere (or fix) to the substrate and/or become water insoluble as a result of the reaction with the substrate also demonstrate significantly reduced smearing and improved water resistance (particularly relative to highlighting compositions including non-eradicable pigments). Non-limiting examples of such water soluble dyes include direct dyes and reactive dyes. Direct dyes are known to hydrogen bond to the hydroxyl functionalities of cellulose fibers. Reactive dyes are known to react with hydroxyl groups of cellulose fibers and fix themselves chemically onto the substrate. The reaction process may be hastened in the presence of a mildly alkaline environment (e.g., a highlighting composition having a pH of about 7.5 to about 10.5 and/or about 8 to about 10) when a reactive dye is used. Examples of direct dyes include but are not limited to Direct Yellow 6, Direct Yellow 8, Direct Yellow 12, Direct Yellow 28, Direct Yellow 29, Direct Yellow 44, Direct Yellow 86, Direct Yellow 99; Direct Orange 29, Direct Orange 34, Direct Orange 37, Direct Orange 39, Direct Orange 102, Direct Orange 108; Direct Red 31, Direct Red 80, Direct Red 81, Direct Red 83, Direct Red 111, Direct Red 227, Direct Red 236, Direct Red 252; Direct Violet 9, Direct Violet 35, Direct Violet 51; Direct Blue 1, Direct Blue 15, Direct Blue 67, Direct Blue 71, Direct Blue 80, Direct Blue 86, Direct Blue 106, Direct Blue 199, Direct Blue 200, Direct Blue 281; Direct Black 17, Direct Black 19, Direct Black 22, Direct Black 56; Direct Green 26, Direct Green 114; Direct Brown 210, and mixtures thereof. Examples of reactive dyes include but are not limited to Reactive Violet 12, Reactive Violet 13, Reactive Violet 14; Reactive Orange 1, Reactive Orange 4, Reactive Orange 15, Reactive Orange 16, Reactive Orange 34, Reactive Orange 37; Reactive Yellow 7, Reactive Yellow 22, Reactive Yellow 24, Reactive Yellow 86; Reactive Yellow 145, Reactive Yellow 160A, Reactive Red 2, Reactive Red 11, Reactive Red 74, Reactive Red 120, Reactive Red 152, Reactive Red 195, Reactive Red 196; and Reactive Blue 4, Reactive Blue 9, Reactive Blue 19, Reactive Blue 21, Reactive Blue 82, Reactive Blue 168, Reactive Blue 194, and mixtures thereof.

A similar non-smearing effect can also be achieved with the use of a binder that binds the non-eradicable colorant(s) to the substrate and, thereby, allows the colorant(s) to be less influenced by application of the eradicator fluid. However, the use of a binder is somewhat undesirable because the binder can form a film which can impede the eradication of the eradicable colorants in the highlighting compositions.

The inks disclosed herein can be used on porous and non-porous substrates. Nonlimiting examples of non-porous substrates include glass, ceramics, porcelain, plastics, metal, glossy paper and other non-porous paper such as cardboard or other hardboard material.

The eradicator fluid preferably includes water or an organic solvent as the primary solvent, and at least one eradicator compound, for example, an oxidizing agent, a reducing agent (including but not limited to a sulfur-containing reducing agent, a basic reducing agent, and combinations thereof), an acid, and/or a base. The eradicator fluid can optionally comprise a binder (or film-forming polymer).

The eradicator fluid functionality is generally attributed to a basic nucleophilic anion associated with various salts including but not limited to sulfites, metasulfites, bisulfites, chlorites, amines, and hydroxides. Typically, the counter cation is sodium, potassium, ammonium or another cation that allows substantial dissolution of the salt in the solvent of choice. If the highlighting composition includes a triphenylmethane dye, the eradicator compound is preferably a sulfite or a metasulfite. If the highlighting composition includes an acid dye, the eradicator compound is preferably a hypochlorite (e.g., CLOROX™ bleach). Most typically, the eradicator fluid comprises a redox species such as a sulfite (e.g., sodium sulfite) or a bisulfite, or an amine (e.g., sodium glycinate) that can cause eradicable colorants (e.g., triarylmethane dyes) to substantially lose their colors or to change color.

Suitable oxidizing agents include acids selected from the group consisting of mineral acids, organic acids, and combinations thereof. The acid oxidizing agent can be a strong acid or weak acid, or a combination thereof. The acid oxidizing agent can also be selected from the group consisting of monobasic acids, di-basic acids, tri-basic acids, tetra-basic acids, and combinations thereof. Preferably, the mineral acids are selected from the group consisting of hydrochloric acid, hydrobromic acid, hydroiodic acid, hydrofluoric acid, nitric acid, sulfuric acid, carbonic acid, chromic acid, phosphoric acid, phosphorous acid, phosphonic acid, and combinations thereof. Preferably, the organic acids are selected from the group consisting of benzoic acid, lactic acid, acetic acid, propanoic acid, acetoacetic acid, crotonic acid, formic acid, glycolic acid, glyoxylic acid, lactic acid, pyruvic acid, trans-aconitic acid, fumaric acid, maleic acid, malic acid, tartaric acid, acetylenedicarboxylic acid, tetrahydrophthalic acid, mesaconic acid, phthalic acid, isophthalic acid, terephthalic acid, itaconic acid, trans-ethyleneoxidedicarboxylic acid, succinic acid, adipic acid, pimellic acid, suberic acid, azelic acid, substituted phosphoric acid, substituted phosphorous, citric acid, hemimellitic acid, trimellitic, trimesic acid, 2-carboxyethyliminodiacetic acid, nitrilotriacetic acid, phosphonic acid, substituted phosphonic acid, mellophanic acid, prehnitic acid, pyromellitic acid, 2-phosphonoethyliminodiacetic acid, diethylenetetraacetic acids, and combinations thereof. The oxidizing agent is preferably miscible or soluble in water, and the oxidizing agent is preferably an aqueous mixture.

The eradicator fluid contains at least about 0.001 wt. %, at least about 0.01 wt. %, and/or at least 0.1 wt. % of the eradicator compound. Furthermore, in various embodiments the eradicator compound contains about 0.001 wt. % to about 20 wt. %, about 0.5 wt. % to about 15 wt. %, and/or about 1.0 wt. % to about 10 wt. % of the eradicator compound.

Typically, when an organic or non-aqueous fluid is used to dissolve and/or disperse the eradicator compound, the non-aqueous fluids comprises at least about 50 weight percent, at least about 60 weight percent, and/or at least about 70 weight percent of a polar aprotic organic solvent. Exemplary polar aprotic organic solvents include acetone, glycol ethers, acetonitrile, hexamethyl phosphoric acid triamide, dimethylsulfoxide, dimethylformamide, formamide, 2-pyrrolidone, propylene carbonate, dichloromethane, trichloroethylene, N-methyl pyrrolidinone, N-vinyl pyrrolidinone, N-methyl morpholine, sulfolane, caprolactam, triacetin, ethylene carbonate, ethyl acetate, tetrahydrofuran, diethyl ether, tetramethylurea, dimethylacetamide, cyclohexanone, other similar solvents, and mixtures thereof. Typically, the polar aprotic organic solvent is a glycol ether such as tetra glyme (other suitable glycol ethers are also disclosed herein), or n-methyl pyrrolidinone, or acetonitrile.

The eradication process can be made reversible upon the application of an agent capable of substantially converting the highlighted marking back to its original form The reversible nature of the eradication process allows for an eradicated or highlighted marking to be substantially converted back to its original color. The reversal system can be used as a mechanism to correct a highlighting error such as when text or other information is inadvertently highlighted (e.g., text is inadvertently eradicated). For complete reversal, a chemical agent should be able to neutralize any remaining eradicator left in the mixture (or any remaining eradicator left in a marking made with the mixture). Preferably, the volatile solvent(s) present in the highlighting mixture (e.g., water) will at least substantially evaporate before an eradicator fluid is applied thereto so as to form highlighted markings, as previously discussed. Similarly, the volatile solvent(s) present in the eradicator fluid (e.g., water) preferably will also at least substantially evaporate (after the eradicator has been applied to the mixture) before an agent capable of substantially reversing the eradication of the eradicable dye(s) is applied to the (highlighted) mixture or markings made therewith.

The selection of the eradicator where such reversal is contemplated therefore requires a first eradicator that is capable of rendering an eradicable colorant substantially colorless when contacted therewith, and a second agent capable of substantially restoring the original color of the eradicated colorant (i.e., an agent capable of substantially converting the highlighted marking back to its original color). When a sulfur-based reducing agent eradicator (e.g., sodium sulfite) is used, the reversibility of the eradication process is particularly facile. Sulfur-based eradicators include sulfite reducing agents (e.g., sodium sulfite), bisulfite reducing agents, metasulfite reducing agents, thiosulfite reducing agents, and combinations thereof.

When a reducing agent is used to eradicate (or highlight) a marking, the reversion (or restoration) of the eradicable colorant from its substantially colorless state back to its substantially colored state can be performed by the application of an oxidizing agent. For an oxidation process to occur, the oxidizing agent must undergo reduction; the relative oxidizing and reducing strengths of the oxidizing agent and the colorless dye can be used to predict whether or not the oxidation of the colorant is likely to occur. Similarly, when an oxidizing agent is used to eradicate a marking, the reversion (or restoration) of the eradicable colorant from its substantially colorless state back to its substantially colored state can be performed by the application of a reducing agent. For an oxidation process to occur, the reducing agent must undergo oxidation; the relative oxidizing and reducing strengths of the reducing agent and the colorless dye can be used to predict whether or not the reduction of the colorant is likely to occur. As a further example, when a pH indicator is used in a mixture, the use of an acid or base eradicator can cause the pH indicator to change color from colored to substantially colorless and the opposite agent may be used to substantially convert the pH indicator back to its original color.

In some embodiments, eradication affected by a reducing agent can be reversed with the addition of a strongly electrophilic species (e.g., a hydronium ion). Thus, the highlighting of a marking can sometimes be reversed by applying an electrophile to the eradicated mixture (e.g., a marking made with the highlighting mixture and subsequently highlighting).

An ink described herein can optionally include a binder resin to impart smear resistance and water resistance to the ink, as previously described. Binder resins for use in the ink include polymers containing glycol repeating units (e.g., polyethylene glycol), polyvinylpyrrolidone, copolymers and salts thereof, polyvinylacetate, copolymers and salts thereof, and polyacrylic acids and copolymers and salts thereof, other film-forming, water-soluble resins, and combinations of the foregoing. The binder resin is typically selected from PVP and copolymers thereof, PVA and copolymers thereof, and combinations of the foregoing. More preferably, the binder resin is selected from PVP, copolymers thereof, and combinations of the foregoing.

The binder resin (when present) can also be used to control the viscosity of the ink. When a highly viscous ink is desired (e.g., cP>10,000), the use of a larger amount of binder resin will achieve a highly viscous ink. When the binder resin used is a polymer (e.g., PVP), the resin can be selected with a wide range of viscosities and molecular weights. For example, PVP is commercially available at various viscosities and in a molecular weight range of 10,000 daltons to 1,300,000 Daltons (Aldrich Chemical Co., Inc., Milwaukee, Wis.) for example. Thus, depending on the molecular weight of the polymer resin, there can be a great deal of variation in the amount of resin utilized in the ink, and the overall viscosity of the ink. When, for example, a low molecular weight PVP is used (about 10,000 to about 50,000 Daltons), the ink can achieve smear and water resistance while still maintaining a low viscosity (e.g., about 2 cps to about 5 cps). A binder resin used herein preferably is present in an amount in a range of about 1 wt. % to about 80 wt. % based on the total weight of the mixture, more preferably about 5 wt. % to about 20 wt. %.

The highlighting composition preferably is an aqueous mixture. Water preferably is present in an amount in a range of about 20% to about 95% by weight of the total weight of the mixture, more preferably about 40% to about 60% by weight. The water acts to dissolve the water-soluble colorants and any other water soluble components of the composition. In addition, the water can serve as a medium to disperse the insoluble pigments used in a highlighting composition. The water present in the compositions also provides an improved washability of the ink from various materials (e.g., clothes) as compared to oil-based inks.

When using a substantially water insoluble non-eradicable dye in a highlighting composition described herein, the solvent system used in the highlighting composition is preferably aqueous and includes an amount of an organic co-solvent to dissolve the water insoluble non-eradicable dye. Often, the organic co-solvent is a polar aprotic organic solvent that is miscible with or substantially soluble in water. Exemplary polar aprotic organic solvents include acetone, glycol ethers, acetonitrile, hexamethyl phosphoric acid triamide, dimethylsulfoxide, dimethylformamide, formamide, 2-pyrrolidone, propylene carbonate, dichloromethane, trichloroethylene, N-methyl pyrrolidinone, N-vinyl pyrrolidinone, N-methyl morpholine, sulfolane, caprolactam, triacetin, ethylene carbonate, ethyl acetate, tetrahydrofuran, diethyl ether, tetramethylurea, dimethylacetamide, cyclohexanone, other similar solvents, and mixtures thereof. However, other solvents may also be used.

When a highlighting composition described herein is used in a delivery system such as a ball-point pen or an ink-jet application where the mechanism for marking is susceptible to clogging and to other impediments, is it preferred to use one or more humectants that decrease the vapor pressure of the composition at atmospheric temperature and pressure. The humectant, when added to the highlighting composition, has the net effect of decreasing the vapor pressure of the composition and thereby prevents excessive drying and building up of composition on the tip of the marking instrument (e.g., ball point, ink-jet nozzle). The humectant will evaporate slower than water, and thus when an aqueous ink includes a humectant, the drying time of the composition will generally increase. In order to optimize and exercise control over the drying time of the highlighting composition, it may be necessary to include more than one humectant. Preferably, the humectant is selected from the group consisting of glycols, ureas, fatty alcohols, dimethylformamide, dimethylsulfoxide, high molecular weight hydrocarbons, and combinations thereof. The humectant (or combination thereof) preferably is present in the highlighting composition in a range of about 5% to about 30% by weight based on the total weight of the composition, more preferably about 10% to about 20% by weight, to achieve a drying time suitable for typical writing instruments and marking applications.

Preferably, the ratio of water to organic solvent (i.e., organic co-solvent and humectant) in a solvent system in the highlighting composition is in a range of about 100:0 to about 30:70 by weight based on the total weight of the mixture, more preferably from about 97:3 to about 50:50.

Glycols for use as a humectant, include, but are not limited to, three broad categories of glycols: (a) glycol ethers (e.g., ethylene glycol monomethyl ether, ethylene glycol monoethyl ether, ethylene glycol monobutyl ether, ethylene glycol monophenyl ether, diethylene glycol monomethyl ether, diethylene glycol monoethyl ether, diethylene glycol monoisopropyl ether, diethylene glycol monobutyl ether, diethylene glycol monophenyl ether, ethylene glycol dimethyl ether, ethylene glycol diethyl ether, diethylene glycol dimethyl ether, propylene glycol monomethyl ether); (b) glycol ether acetates such as ethylene glycol monomethyl ether acetate, ethylene glycol monoethyl ether acetate (e.g., ethylene glycol monobutyl ether acetate, ethylene glycol monophenyl ether acetate, diethylene glycol monomethyl ether acetate, diethylene glycol monoethyl ether acetate, diethylene glycol monobutyl ether acetate, diethylene glycol monophenyl ether acetate, diethylene glycol monoisopropyl ether acetate, ethylene glycol dimethyl ether acetate, ethylene glycol diethyl ether acetate, diethylene glycol dimethyl ether acetate, propylene glycol monomethyl ether acetate, and the like); and (c) glycol acetates (e.g., ethylene glycol monoacetate, ethylene glycol diacetate, and diethylene glycol diacetate). A highlighting composition can include other glycols not within one of these three categories, such as ethylene glycol, and ethoxylated glycols. Any of the preceding glycols may be used in the highlighting compositions.

Fatty alcohols for use as a humectant, include, but are not limited to, alcohols having eight through twenty carbon atoms, and fatty alcohols that are ethoxylated with one to three moles of ethylene oxide. Examples of fatty alcohols and ethoxylated fatty alcohols include, but are not limited to, behenyl alcohol, caprylic alcohol, cetyl alcohol, cetaryl alcohol, decyl alcohol, lauryl alcohol, isocetyl alcohol, myristyl alcohol, oleyl alcohol, stearyl alcohol, tallow alcohol, steareth-2, ceteth-1, cetearth-3, and laureth-2. Additional suitable fatty alcohols are listed in CTFA Cosmetic Ingredient Handbook, First ed., J. Nikotakis (Ed.), The Cosmetic, Toiletry and Fragrance Association, pages 28 and 45 (1988), the disclosure of which is hereby incorporated herein by reference.

For a liquid to effectively wet and spread out on a surface (e.g., paper), the surface tension of the liquid must be less than the surface tension of the surface. Accordingly, the highlighting composition can include conventional surface tension modifiers. A co-solvent can also be selected to alter the surface tension of the mixture to create a mixture that has enough surface tension to wet a variety of surfaces.

A highlighting composition described herein can be used as an ink to make markings on a variety of substrates (e.g., paper). In an ink, a surfactant can be used to improve the absorption of an ink by a substrate (e.g., paper). A binder (or film-forming agent) can be used to improve the adhesion of the resulting marking to the substrate, as previously described. Thus, the mixture described herein can include one or more additives selected from the group consisting of surfactants, biocides, anti-corrosive agents, sequestering agents, anti-crusting agents, rheology control agents, binder resins, film-forming agents, and combinations thereof, in the amounts and proportions conventionally used in inks for various applications.

Rotary printing methods including but not limited to flexography, offset printing, and rotogravure are well known and enable good quality printing. See, e.g., U.S. Pat. Nos. 6,851,359 and 4,907,508, which are incorporated herein by reference. Rotary printing methods use a first cylinder having a curved printing surface for ink transfer to a substrate (i.e., for printing), and a second cylinder for carrying (or supporting) the substrate. For example, the devices implemented in offset printing usually comprise an inking unit that applies ink on a cylinder, which carries a plate bearing the pattern to be reproduced (called a plate-holder-cylinder).

The plate-holder-cylinder is in contact with a cylinder that carries a blanket (blanket-holder-cylinder) which is itself in contact with the paper that is inserted between the blanket-holder-cylinder, more precisely the blanket itself, and a back-pressure cylinder. A highlighting marking composition as described herein can be used in an offset printing process. Thus, in one embodiment, the disclosure provides an offset printing method comprising printing the text to be printed on a plate holder-cylinder with an ink according to an embodiment of the disclosure, transferring said text onto a blanket carried by a blanket-holder-cylinder, and transferring the text onto a paper compressed between the blanket and a backpressure cylinder.

Another embodiment of the disclosure provides a method of printing in a desktop printer, e.g., an ink-jet printer, comprising applying a highlighting composition described herein onto a substrate such as paper. The highlighting compositions can be used in a home-office ink-jet system (e.g., a reservoir of a HEWLETT-PACKARD™ ink-jet printer cartridge can be filled with a highlighting composition in accordance with the disclosure), and in commercial and industrial ink-jet applications. An inkjet printer uses ink cartridges that deposit ink directly onto a substrate such as paper. Ink-jet printers for use with a highlighting composition described herein include those that use the continuous ink-jet printer technology, which deflects and controls a continuous ink-jet droplet stream direction onto the printed media or into a gutter for recirculation by applying an electric field to previously charged ink-jet droplets, and those that use the drop-on-demand ink-jet technology (e.g., piezoelectric and thermal ink-jet printheads), which ejects ink droplets only when they are needed to print on the media. Preferred delivery systems include both piezoelectric ink-jet printheads and thermal ink-jet printheads. Ink compositions used in combination with drop-on-demand ink-jet technology typically have a resistivity higher than 1000 ohms·centimeter ("Ω·cm"), and more preferably higher than 10000 Ω·cm. In contrast, ink compositions used in combination with continuous ink-jet printer technology typically have a resistivity from about 20 Ω·cm to about 2000 Ω·cm. Various compounds including lithium perchlorate and lithium nitrate can be used to adjust the resistivity of a given ink composition.

Rotary printing and desktop printing methods can be used (in conjunction with a highlighting composition according to the disclosure) to provide various types of highlightable printed patterns and/or other textual information in various media including but not limited to books (e.g., school-type text books), magazines, newspapers, trade journals, advertisements, and/or individual pages of same.

A highlighting composition described herein can be used in a number of applications, as described above. The viscosity of the highlighting compositions typically varies based on the intended application. Binders and/or rheology modifiers can be included in order to adjust the viscosity of a highlighting composition. The viscosity of the highlighting compositions is typically less than about 20 centiposes (cps) and/or less than about 5 cps when the highlighting compositions are used in marker pens. The viscosity of the highlighting compositions is typically between about 1000 cps and about 10,000 cps and/or between about 1000 cps and about 3000 cps when the highlighting compositions are used in ball point pens. The viscosity of the highlighting compositions is typically less than about 50 cps, less than about 20 cps, and/or less than 10 cps when the highlighting compositions are used in ink jet printing cartridges. The viscosity of the highlighting compositions is typically between about 1000 cps and about 20,000 cps and/or between about 5000 cps and 15,000 cps when used in offset printing and stamping applications. Further, the viscosity of the highlighting compositions is typically between about 30 cps and about 100 cps and/or between about 50 cps and 80 cps when used in rotogravure applications.

A highlighting composition can also be used in applications that do not involve the application of the highlighting composition onto a substrate (e.g., as an ink). Thus, a highlighting composition described herein can be used with or without a substrate serving as a situs of the highlighting or color-changing effect. For example, the highlighting compositions described herein could be used in an application wherein the highlighting composition and an eradicator mix in the liquid phase to create a color change to the mixture when the eradication solution contacts the highlighting composition. In another example, the highlighting composition described herein can be combined in the liquid phase with a non-aqueous eradicator that creates a biphasic mixture wherein the highlighting or color-changing effect of the mixture occurs at the biphasic interface of the two solutions.

EXAMPLES

Highlighting marking compositions in accordance with the disclosure can be better understood in light of the following examples, which are merely illustrative, and thus are not meant to limit the scope of the appended claims in any way.

Example 1

A highlighting ink was prepared with the ingredients identified below in the amounts shown in Table III:

TABLE III

| Component | Function | Amount (wt. %) |
| --- | --- | --- |
| Water | Solvent | 76.48 |
| Propylene Glycol | Organic Solvent | 19.12 |
| Basic Green 4 | Eradicable (triarylmethane) Dye | 0.96 |
| LUCONYL ® 3855 | Pigment | 3.44 |

The propylene glycol was added at room temperature to the water and mixed until a homogenous, particulate-free solution was formed. The Basic Green 4 dye was then added to this solution and the solution was mixed until the dye were fully dissolved. The pigment was then added and the solution was mixed for an hour until a homogenous solution was formed.

The resulting ink was then put into a SHARPIE® marker and applied to a sheet of white paper to determine the color of the ink once applied to the substrate. The ink was observed to be a dark green color.

As described above, it is believed that the major contributing factor to the length of time it takes to highlight an ink described herein is proportional to the weight percent of eradicable dye present in the ink. Thus, after the ink was applied to a white sheet of paper, the eradication time was tested with a commercially available eradicator solution available from Sanford Reynolds (Valence, France). Upon the application of the eradication solution to the marking, the marking changed in color from a dark green to a red, and this conversion took approximately five seconds.

Example 2

Two highlighting ink mixtures were prepared with the ingredients identified below in the amounts shown in Table IV:

TABLE IV

| Component | Function | Amount (wt. %) Formulation 1 | Amount (wt. %) Formulation 2 |
| --- | --- | --- | --- |
| Deionized Water | Solvent | 66.15 | 64.1 |
| Propylene Glycol | Organic Solvent | 20.00 | 20.00 |
| SPECTRAZINE ® Yellow GRL 200% | Non-Eradicable Dye | 0.35 | 0.50 |
| SPECTRAZINE ® Brilliant Blue | Non-Eradicable Dye | | 3.00 |
| SPECTRA ® Soluble Blue 2B EX | Eradicable Dye | | 1.50 |
| SPECTRACID ® Black | Eradicable Dye | 6.00 | |
| HOSTAFINE ® RED HF3S | Pigment | 7.50 | |
| HOSTAFINE ® GREEN GN | Pigment | | 10.00 |
| Sodium Acetate | Salt | | 0.90 |

The propylene glycol was added at room temperature to the water and mixed until a homogenous, particulate-free solution was formed. The eradicable dyes were added (SPECTRACID® Black (Spectra Colors Corporation, Kearny, New Jersey) to Formulation 1 and SPECTRA® Soluble Blue 2B EX (Spectra Colors Corporation, Kearny, N.J.) to Formulation 2) and non-eradicable dyes (SPECTRAZINE® Yellow GRL 200%, Colour Index No. Basic Yellow 291 (Spectra Colors Corporation, Kearny, N.J.) to Formulations 1 and 2, and SPECTRAZINE® Bril. Blue, Colour Index No. Basic Blue 1 (Spectra Colors Corporation, Kearny, N.) to Formulation 2) were then added to this solution and the solution was mixed until the dyes were fully dissolved. The pigments (HOSTAFINE® RED HF3S, Colour Index No. Pigment Red 188 (Clariant Corporation, Coventry, R.I.) to Formulation 1 and HOSTAFINE® GREEN GN, Colour Index No. Pigment Green 7 (Clariant Corporation, Coventry, R.I.) to Formulation 2) were then added and the solution was mixed for an hour until a homogenous solution was formed.

The resulting inks were then put into SHARPIE® markers and applied to a sheet of white paper to determine the color of the ink once applied to the substrate. The markings resulting from the application of formulations 1 and 2 were observed as a rich black in color. The resulting markings on white paper were then treated with a commercially available eradicator solution available from Sanford Reynolds (Valence, France). The markings made with Formulation 1 changed color from black to red, and the marking made with Formulation 2 changed color from black to green. The eradication of the markings made with both formulations 1 and 2 did not result in smearing of the marking and only the marking made with the ink (e.g., words written on paper) changed color (i.e., showed a highlighting effect).

Example 3

Mixtures that include an acid oxidizing agent were prepared by mixing the materials listed in Table V until a homogenous mixture was formed:

TABLE V

| Component | Function | Amount (wt. %) |
| --- | --- | --- |
| Water | Solvent | 95 |
| Phosphoric acids (75%) | Acid/Oxidizing Agent | 5 |

The resulting aqueous mixture was placed in a POCKET ACCENT® marker and applied to a marking made and eradicated as described in Example 1. The application of this aqueous acid mixture to the highlighted marking converted the red eradicated marking back to a dark green color that appears to the human eye to be identical to the color of the non-eradicated mixture prepared in Example 1. The reversal of color from red to dark green (apparently black) took approximately five seconds.

Example 4

Mixtures that include an acid oxidizing agent were prepared by mixing the materials listed in Table VI until a homogenous mixture was formed:

TABLE VI

| Component | Function | Amount (wt. %) |
|---|---|---|
| Water | Solvent | 95 |
| Citric Acid | Acid/Oxidizing Agent | 5 |

The resulting aqueous mixture was placed in a POCKET ACCENT® marker and applied to a marking made and highlighted (or eradicated) as described in Example 1. The application of this aqueous acid mixture to the eradicated marking converted the red eradicated marking back to a dark green color that appears to the human eye to be identical to the color of the non-eradicated mixture prepared in Example 1. The reversal of color from red to dark green (apparently black) took approximately five seconds.

Example 5

Mixtures that include an acid oxidizing agent were prepared by mixing the materials listed in Table VII until a homogenous mixture was formed:

TABLE VII

| Component | Function | Amount (wt. %) |
|---|---|---|
| Water | Solvent | 85 |
| Citric Acid | Acid/Oxidizing Agent | 10 |
| Phosphoric acids (75%) | Acid/Oxidizing Agent | 5 |

The resulting aqueous mixture was placed in a POCKET ACCENT marker and applied to a marking made and highlighted as described in Example 1. The application of this aqueous acid mixture to the highlighted marking converted the red highlighted marking back to a dark green color that appears to the human eye to be identical to the color of the non-eradicated mixture prepared in Example 1. The reversal of color from red to dark green (apparently black) took approximately five seconds.

Example 6

A highlighting ink mixture was prepared with the ingredients identified below in the amounts shown in Table VIII:

TABLE VIII

| Component | Function | Amount (wt. %) |
|---|---|---|
| N-Methyl Pyrrolidinone | Solvent | 83.26 |
| Basic Green 4 | Eradicable (triarylmethane) dye | 1.46 |
| Acid Blue 93 | Eradicable (triarylmethane) dye | 9.25 |
| KEYFAST SPECIAL ™ YELLOW | Non-Eradicable Dye (Solvent Yellow 43) | 0.59 |
| MORPLAS ™ 813 | Non-Eradicable Dye (azo dye) | 5.44 |

To the N-methyl pyrrolidinone (Aldrich Chemical Co., Inc., Milwaukee, Wis.) the colorants were added (Basic Green 4, Acid Blue 93, and KEYFAST SPECIAL™ YELLOW (Keystone Aniline Corp., Chicago, Illinois). To that mixture the MORPLAS™ 813 (a red colorant available from Sunbelt Corp., Rock Hill, S.C.) and the mixture was stirred until a homogenous mixture resulted.

The resulting ink was then put into SHARPIE® markers and applied to a sheet of white paper to determine the color of the ink once applied to the substrate. The markings resulting from the application of this ink mixture were observed as a black in color. The resulting markings on white paper were then treated with the eradicator prepared according to the procedure described in Example 7 below. The markings made the ink changed color from black to red. The eradication of the markings did not result in smearing of the marking and only the marking made with the ink (e.g., words written on paper) changed color (i.e., showed a highlighting effect).

Example 7

An eradicator solution was prepared by mixing the materials listed in Table IX until a homogenous mixture was formed:

TABLE IX

| Component | Function | Amount (wt. %) |
|---|---|---|
| Water | Solvent | 43 |
| Propylene Glycol | Solvent | 50 |
| Sodium Sulfite | Reducing Agent | 7 |

The resulting aqueous mixture was placed in a POCKET ACCENT® marker and applied to a marking made as described in Example 6. The application of this aqueous mixture to the highlighted marking converted the black marking made with the highlighting composition of Example 6 into a red color. The color change from black to red took approximately five (5) seconds.

Example 8

Two highlighting ink mixtures were prepared with the ingredients identified below in the amounts shown in Table X:

TABLE X

| Component | Function | Amount (wt. %) (formulation 1) | Amount (wt. %) (formulation 2) |
|---|---|---|---|
| Water | Solvent | 18.4 | 18.4 |
| Glycerol | Organic Solvent | 30.55 | 35.05 |
| Propylene Glycol | Co-Solvent | 10 | 10 |
| Citric acid | pH Adjuster | 10 | 10 |

TABLE X-continued

| Component | Function | Amount (wt. %) (formulation 1) | Amount (wt. %) (formulation 2) |
|---|---|---|---|
| Phosphoric acid | pH Adjuster | 9.5 | 5 |
| Benzotrizole | Corrosion Inhibitor | 0.3 | 0.3 |
| Acid Blue 93 | Eradicable Dye | 14 | 14 |
| Hostafine Red HF3S | Pigment | 3 | 3 |
| Congo Red TS | pH Indicator | 0 | 4 |
| Eoisin Bluish | pH Indicator | 4 | 0 |
| Xanthan Gum | Thickening/ Gelling Agent | 0.25 | 0.25 |

The xanthan gum (Kelzan®, CP Keloco, Atlanta, Ga.) was added at room temperature to the water and mixed for approximately thirty minutes until a homogenous, particulate-free gel was formed. The propylene glycol and glycerol were then added and the materials were mixed until the organic solvents were mixed fully mixed into the gelatin. The pH adjusters (citric acid and phosphoric acid) were then added and the mixture was stirred for approximately five minutes. The colorants were then slowly added (in four increments over one hour) to the mixture with continuous stirring.

The resulting inks were then put into a ball-point pen and applied to a sheet of white paper to determine the color of the ink once applied to the substrate. The markings resulting from the application of formulations 1 and 2 were observed as a blue in color. The resulting markings on white paper were then treated with a commercially available eradicator solution available from Sanford Reynolds (Valence, France). The markings made with Formulation 1 changed color from dark blue to a fluorescent pink, and the marking made with Formulation 2 changed color from dark blue to pink. Application of an eradicator fluid to the markings made with formulations 1 and 2 did not result in smearing of the markings and only the markings made with the ink (e.g., words written on paper) changed color (i.e., showed a highlighting effect).

Example 9

Five highlighting ink mixtures were prepared with the ingredients identified below in the amounts shown in Table XI:

TABLE XI

| Component (Function) | Amount (wt. %) (form. 1) | Amount (wt. %) (form. 2) | Amount (wt. %) (form. 3) | Amount (wt. %) (form. 4) | Amount (wt. %) (form. 5) |
|---|---|---|---|---|---|
| Water (solvent) | 54.85 | 54.85 | 52.85 | 51.85 | 52.85 |
| Propylene Glycol (co-solvent) | 30 | 30 | 30.5 | 30.5 | 22.5 |
| Polysiloxane (defoamer/ surfactant) | 0.1 | 0.1 | 0.1 | 0.1 | 0.1 |
| Dowicil ® 150 (anti-microbial agent) | 0.05 | 0.05 | 0.05 | 0.05 | 0.05 |
| Acid Blue 93 (eradicable dye) | 11 | 11 | 11 | 11.5 | 11.5 |
| Hostafine Red HF3S (pigment) | 0 | 0 | 2 | 2 | 0 |
| Phosphoric acid (pH adjuster) | 1 | 1 | 0.5 | 1 | 3 |
| Phenol Red (pH indicator) | 3 | 0 | 0 | 0 | 0 |

TABLE XI-continued

| Component (Function) | Amount (wt. %) (form. 1) | Amount (wt. %) (form. 2) | Amount (wt. %) (form. 3) | Amount (wt. %) (form. 4) | Amount (wt. %) (form. 5) |
|---|---|---|---|---|---|
| Phenolpthalein (pH indicator) | 0 | 3 | 0 | 0 | 0 |
| o-Cresolphthalein (pH indicator) | 0 | 0 | 3 | 0 | 0 |
| Congo Red TS (pH indicator) | 0 | 0 | 0 | 3 | 0 |
| Eoisin Bluish (pH indicator) | 0 | 0 | 0 | 0 | 10 |

The solvent and co-solvents were mixed and the polysiloxane (DEE FO PI™ 40, Ultra Additives Company, Bloomfield, N.J.) and Dowicil® 150 (Dow Chemical Company, Midland, Mich.) were added at room temperature to that mixture. The eradicable dye (Acid Blue 93) was then slowly added slowly (in four increments over one hour) to the mixture with continuous stirring. The pigment, pH indicators and pH adjusters were then added to the mixture and the mixture was allowed to stir for forty-five minutes.

The resulting inks were then put into SHARPIE® markers and applied to a sheet of white paper to determine the color of the ink once applied to the substrate. The resulting markings on white paper were then treated with a commercially available eradicator solution available from Sanford Reynolds (Valence, France). The marking resulting from the application of formulation 1 was observed as a black in color and appeared to changed to dark red after highlighting. The marking resulting from the application of formulation 2 was observed as a black in color and appeared to changed to dark pink upon eradication. The markings resulting from the application of formulations 3, 4, and 5 were observed as blue in color and changed to pink upon highlighting.

Example 9

Three highlighting ink mixtures were prepared with the ingredients identified below in the amounts shown in Table XII:

TABLE XII

| Component | Function | Amount (wt. %) Formulation 1 | Amount (wt. %) Formulation 2 | Amount (wt. %) Formulation 3 |
|---|---|---|---|---|
| Formamide | Solvent | 80.00 | 86.02 | 84.21 |
| Basic Green 4 | Eradicable (triarylmethane) dye | 10.00 | — | — |
| NEOZAPON ® Red 365 | Non-Eradicable Dye (Solvent Red 160) | 10.00 | — | — |
| Solvent Green 7 | Non-Eradicable Dye | — | 3.23 | — |
| Acid Blue 93 | Eradicable (triarylmethane) dye | — | 10.75 | — |
| Basic Red 14 | Eradicable Dye | — | — | 5.26 |
| UNIFLOW ® Yellow 1110 | Non-Eradicable Dye | — | — | 10.53 |

The colorants were added to the solvent, and the mixture was stirred until all solids were dissolved. The resulting highlighting composition was loaded into a pen refill and applied to a sheet of white paper to determine the color of the composition once applied to the substrate.

A vivid black marking was produced with the highlighting composition according to formulation 1. The resulting markings were then treated with a commercially available eradicator fluid (Sanford Reynolds, Valence, France). Upon application of the eradicator fluid, the markings changed from black to bright red. The eradication of the markings did not result in smearing of the markings and only the markings made with the highlighting composition (e.g., words written on paper) changed color (i.e., showed a highlighting effect).

A vivid blue marking was produced with the highlighting composition according to formulation 2. The resulting markings were then treated with a commercially available eradicator fluid (Sanford Reynolds, Valence, France). Upon application of the eradicator fluid, the markings changed from blue to bright green. The eradication of the markings did not result in smearing of the markings and only the markings made with the highlighting composition (e.g., words written on paper) changed color (i.e., showed a highlighting effect).

A vivid orange marking was produced with the highlighting composition according to formulation 3. The resulting markings were then treated with a commercially available eradicator fluid (Sanford Reynolds, Valence, France). Upon application of the eradicator fluid, the markings changed from orange to yellow. The eradication of the markings did not result in smearing of the markings and only the markings made with the highlighting composition (e.g., words written on paper) changed color (i.e., showed a highlighting effect).

Example 10

The highlighting composition according to formulation 1 of Example 9 was loaded into a stamping pad, and a rubber stamp was used to pick up the highlighting composition and transfer it to paper. The black markings changed from black to bright red after treatment with a commercially available eradicator fluid (Sanford Reynolds, Valence, France). The eradication of the markings did not result in smearing of the markings and only the markings made with the highlighting composition (e.g., the stamped printed markings) changed color (i.e., showed a highlighting effect).

Example 11

0.025 part of Acid Green 3 (a green eradicable dye available from Spectra Colors, Kearny, N.J.) and 0.025 parts of MORPLAS™ 813 (a red non-eradicable azo dye complex available from Sunbelt Corp., Rock Hill, S.C) were dissolved in 0.2 parts of N-methylpyrrolidine (Aldrich Chemical Co., Milwaukee, Wis.). 0.75 parts of ethylene glycol (Aldrich Chemical Co., Milwaukee, Wis.) was added, and the mixture was mixed until a homogenous mixture was achieved. The highlighting composition was then loaded into an ink-jet cartridge (Model 70, Lexmark International Inc., Lexington, Ky.) and printed on paper using an inkjet printer (Model X-125, Lexmark International Inc., Lexington, Ky.). The black print formed showed a color change from black to red upon application of a commercially available eradicator fluid (Sanford Reynolds, Valence, France). The eradication of the markings did not result in smearing of the markings and only the markings made with the highlighting composition (e.g., words written on paper) changed color (i.e., showed a highlighting effect).

The foregoing description is given for clearness of understanding only, and no unnecessary limitations should be understood therefrom, as modifications within the scope of the disclosure may be apparent to those having ordinary skill in the art. Throughout the specification, where compositions are described as including components or materials, it is contemplated that the compositions can also consist essentially of, or consist of, any combination of the recited components or materials, unless stated otherwise.

What is claimed is:

1. A highlighting composition comprising:
   at least one eradicable dye capable of becoming substantially colorless or of changing color;
   at least one non-eradicable dye incapable of becoming substantially colorless or of changing color; and
   at least one solvent,
   wherein the non-eradicable dye is selected from the group consisting of reactive dyes and direct dyes.

2. The highlighting composition of claim 1, wherein said eradicable dye is selected from the group consisting of diarylmethane derivatives, triarylmethane derivatives, methine dyes, and combinations thereof.

3. The highlighting composition of claim 1, wherein said eradicable dye comprises a pH indicator.

4. The highlighting composition of claim 1, further comprising a pH indicator that is substantially colorless.

5. The highlighting composition of claim 4, wherein said substantially colorless pH indicator is selected from the group consisting of o-Cresolphthalein, Eosin B, Phenolphthalein, Ethyl Red, Quinaldine Red, and combinations thereof.

6. The highlighting composition of claim 1, wherein said highlighting composition is substantially free of pigments.

7. The highlighting composition of claim 1, wherein said eradicable dye is present in an amount from about 0.01 to about 30 wt. %.

8. The highlighting composition of claim 1, wherein said non- eradicable dye is present in an amount from about 0.01 to about 30 wt. %.

9. The highlighting composition of claim 1, wherein said non-eradicable dye is substantially insoluble in water.

10. The highlighting composition of claim 1, wherein said non-eradicable dye is substantially insoluble in an organic solvent.

11. The highlighting composition of claim 1, further comprising a binder resin.

12. A marking instrument containing the highlighting composition of claim 1.

13. An ink-jet cartridge containing the highlighting composition of claim 1.

14. A highlighting ink kit, comprising a first marking instrument comprising a highlighting composition of claim 1 and a second marking instrument comprising an eradicator.

15. The highlighting ink kit of claim 14, wherein said eradicator is dissolved or dispersed in an aqueous mixture and is selected from the group consisting of a base, an acid, an oxidizing agent, a reducing agent, and combinations thereof.

16. The highlighting ink kit of claim 15, wherein the non-eradicable dye is substantially insoluble in water.

17. The highlighting ink kit of claim 14, wherein said eradicator is dissolved or dispersed in a mixture comprising a non-aqueous fluid and is selected from the group consisting of a base, an acid, an oxidizing agent, a reducing agent, and combinations thereof.

18. The highlighting ink kit of claim 17, wherein the non-eradicable dye is substantially insoluble in the non-aqueous fluid.

19. The highlighting ink kit of claim 18, wherein the non-aqueous fluid comprises at least about 50 weight percent of a polar aprotic solvent.

20. A highlighting ink kit comprising:
- a first marking instrument comprising a highlighting composition comprising at least one eradicable dye capable of becoming substantially colorless or of changing color, at least one non-eradicable dye incapable of becoming substantially colorless or of changing color, and at least one solvent;
- a second marking instrument comprising an eradicator; and
- a third marking instrument comprising an agent capable of substantially converting an eradicated dye back to its original form.

21. The highlighting ink kit of claim 20, wherein said agent is selected from the group consisting of a base, an acid, an oxidizing agent, a reducing agent, and combinations thereof.

22. A method of highlighting, comprising making a marking with the highlighting composition of claim 1, and applying an eradicator to at least a portion of said marking to form a highlighted marking.

23. A method of reversibly highlighting, comprising:
- making a marking with a highlighting composition comprising at least one eradicable dye capable of becoming substantially colorless or of changing color, at least one non-eradicable dye incapable of becoming substantially colorless or of changing color, and at least one solvent,
- applying an eradicator to at least a portion of said marking to form a highlighted marking, and
- applying an agent capable of substantially converting the highlighted marking back to its original form.

24. A method of rotary printing comprising transferring the highlighting composition of claim 1 from a first cylinder to a substrate carried by a second cylinder.

25. A highlighting composition, comprising:
- at least one eradicable colorant capable of becoming substantially colorless or of changing color;
- at least one non-eradicable dye incapable of becoming substantially colorless or of changing color;
- at least one substantially colorless pH indicator or at least one pH indicator having substantially the same color as the combination of the eradicable colorant(s) and the non-eradicable colorant(s) in the mixture; and
- at least one solvent,
- wherein the non-eradicable dye is selected from the group consisting of reactive dyes and direct dyes.

26. The highlighting composition of claim 25, wherein said composition is a primary color selected from the group consisting of red, blue, and yellow.

27. The highlighting composition of claim 25, wherein said eradicable colorant comprises an eradicable dye selected from the group consisting of triarylmethane dyes, diarylmethane dyes, methine dyes, and combinations thereof.

28. The highlighting composition of claim 25, wherein said pH indicator is selected from the group consisting of Congo Red, o-Cresolphthalein, Eosin B, Phenolphthalein, Ethyl Red, Quinaldine Red, and combinations thereof.

29. A marking instrument containing the highlighting composition of claim 25.

30. A highlighting ink kit, comprising a first marking instrument comprising the highlighting composition of claim 25 and a second marking instrument comprising an eradicator.

31. A method of highlighting, comprising making a marking with the highlighting composition of claim 25, and applying an eradicator to at least a portion of said marking to form a highlighted marking.

32. A method of reversibly highlighting, comprising:
- making a marking with the highlighting composition comprising at least one eradicable colorant capable of becoming substantially colorless or of changing color, at least one non-eradicable colorant incapable of becoming substantially colorless or of changing color, at least one substantially colorless pH indicator or at least one pH indicator having substantially the same color as the combination of the eradicable colorant(s) and the non-eradicable colorant(s) in the mixture, and at least one solvent,
- applying an eradicator to at least a portion of said marking to form a highlighted marking, and
- applying an agent capable of substantially converting the highlighted marking back to its original form.

33. A method of rotary printing comprising transferring the highlighting composition of claim 25 to a substrate carried by a second sylinder.

34. An injk-jet cartridge containing the highlighting composition of claim 25.

* * * * *